(12) United States Patent
Kumagai et al.

(10) Patent No.: US 9,273,960 B2
(45) Date of Patent: Mar. 1, 2016

(54) LASER SURVEYING SYSTEM

(71) Applicant: Kabushiki Kaisha TOPCON, Tokyo (JP)

(72) Inventors: Kaoru Kumagai, Tokyo (JP); Junichi Kodaira, Tokyo (JP); Fumihiko Kamizono, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 0 days.

(21) Appl. No.: 14/502,712

(22) Filed: Sep. 30, 2014

(65) Prior Publication Data

US 2015/0092198 A1    Apr. 2, 2015

(30) Foreign Application Priority Data

Sep. 30, 2013 (JP) .................... 2013-203866

(51) Int. Cl.
| | |
|---|---|
| *G01B 11/14* | (2006.01) |
| *G01C 15/00* | (2006.01) |
| *G01B 11/02* | (2006.01) |

(52) U.S. Cl.
CPC ............ *G01C 15/002* (2013.01); *G01B 11/026* (2013.01); *G01C 15/004* (2013.01); *G01C 15/008* (2013.01)

(58) Field of Classification Search
CPC ...... G01C 15/004; G01C 15/002; G01C 1/02; G01S 17/06; G01S 17/74; G01S 7/4811; G01S 17/023; G01S 17/42; G01S 19/04; G01S 19/07; G01S 19/10; G01S 19/46; G01S 7/4817; G01B 11/002; G01B 11/26
See application file for complete search history.

(56) References Cited

U.S. PATENT DOCUMENTS

| | | | | |
|---|---|---|---|---|
| 5,784,155 | A * | 7/1998 | Ohtomo et al. | ............ 356/141.1 |
| 5,898,490 | A * | 4/1999 | Ohtomo et al. | ............ 356/141.3 |
| 5,946,087 | A * | 8/1999 | Kasori et al. | ................. 356/249 |
| 6,011,613 | A * | 1/2000 | Ohtomo et al. | ............ 356/4.08 |
| 2003/0068257 | A1 | 4/2003 | Yamazaki et al. | |

FOREIGN PATENT DOCUMENTS

| | | |
|---|---|---|
| JP | 2003-065762 A | 3/2003 |
| WO | 2006/076935 A1 | 7/2006 |

OTHER PUBLICATIONS

Search report issued in corresponding European Application No. 14186583.2, mailed Feb. 20, 2015 (6 pages).

\* cited by examiner

*Primary Examiner* — Michael P Stafira
(74) *Attorney, Agent, or Firm* — Osha Liang LLP

(57) ABSTRACT

A laser surveying system includes a rotational light emitting unit to rotationally emit a laser beam, having a case and a beam emitter supported on the case with an optical axis of the laser beam rotatable relative to the case, and a light receiving unit to receive the laser beam from the rotational light emitting unit and perform surveying of a light-receiving position, wherein the laser surveying system is configured to determine whether or not the laser beam received by the light receiving unit has been properly emitted from the rotational light emitting unit on the basis of a rotational position of the optical axis of the laser beam relative to the case and an angle of site of the laser beam relative to a reference plane including the optical axis.

8 Claims, 14 Drawing Sheets

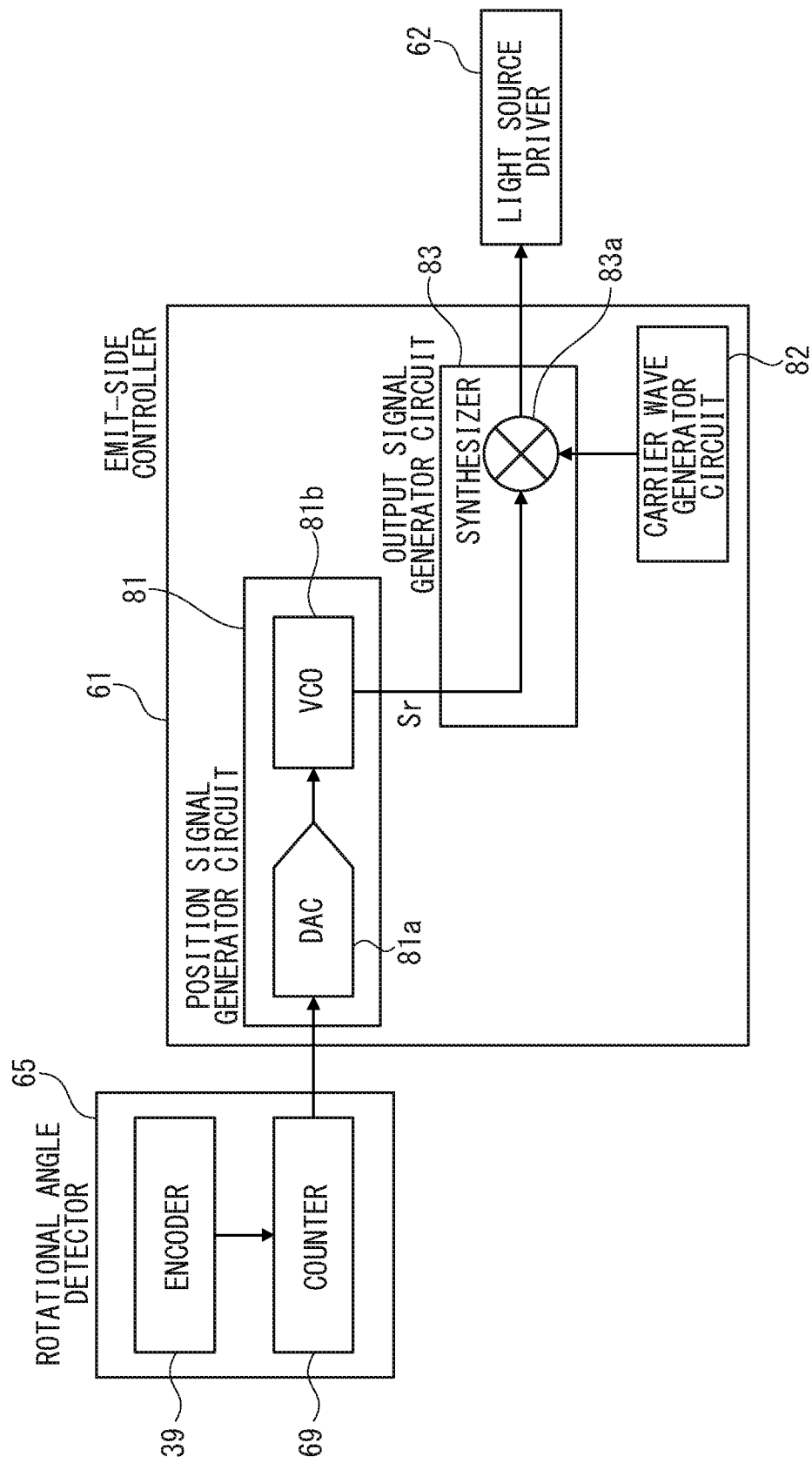

LASER SURVEYING SYSTEM

CROSS REFERENCE TO RELATED APPLICATION

The present application is based on and claims priority from Japanese Patent Application No. 2013-203866, filed on Sep. 30, 2013, the disclosure of which is hereby incorporated by reference in its entirety.

BACKGROUND OF THE INVENTION

1. Field of the Invention

The present invention relates to a laser surveying system which comprises a rotational light emitting unit to rotationally emit a laser beam and a light receiving unit to receive the laser beam, to measure the position of the light receiving unit.

2. Description of the Related Art

For instance, Japanese Laid-open Patent Application Publication No. 2003-65762 discloses a rotational laser device for use in surveying for engineering works or the like, to rotationally irradiate a target with a laser beam and measure the tilt angle and height of the target relative to a plane orthogonal to a rotational axis according to a reflected light from the target.

Further, the use of a laser surveying system comprising a rotational light emitting unit and a light receiving unit to receive a laser beam from the rotational light emitting unit and measure a position relative to the rotational light emitting unit is known. This system can measure the angle of site and height of the rotational light emitting unit relative to the optical axis on the basis of a light receiving signal of the light receiving unit.

This rotational light emitting unit is comprised of a rotator rotatable around the axis relative to a case and a light emitting unit provided in the rotator to emit a certain laser beam. The rotational light emitting unit includes a ceiling covering above the rotator for the purpose of water resistance and protecting the rotator and the exit of the light emitting unit. The ceiling requires vertical columns in a space between the ceiling and the case to support the ceiling outside the rotator.

When the rotator is rotated relative to the case, a laser beam from the emitter may be partially blocked by the vertical columns while crossing them. This makes it difficult for the rotational light emitting unit to properly emit a laser beam in the positions of the columns in a rotational direction of the rotator. Accordingly, the laser surveying system including the rotational light emitting unit cannot accurately survey based on the light received by the light receiving unit which is blocked by the columns. In view of this, in this system a certain light shielding area in which the laser beam is partially blocked by the columns is preset in the rotational direction of the rotator so that the system does not perform surveying on the basis of a laser beam output from the light shielding area and received at the light receiving unit.

However, there is a problem that the light shielding area contains an area not blocked by the columns since it is set in accordance with a rotational position or rotational angle of the rotator about the rotational axis. Thus, the laser surveying system may not perform surveying on the basis of the laser beam received by the light receiving unit which has been properly emitted and not blocked by the columns, if the laser beam is in the light shielding area. This results in unnecessarily narrowing a proper surveying area.

SUMMARY OF THE INVENTION

The present invention aims to provide a laser surveying system which can prevent unnecessarily narrowing a proper surveying area while preventing degradation in the quality of surveying.

According to one embodiment, a laser surveying system comprises a rotational light emitting unit to rotationally emit a laser beam, comprising a case and a beam emitter supported on the case with an optical axis of the laser beam rotatable relative to the case, and a light receiving unit to receive the laser beam from the rotational light emitting unit and perform surveying of a light-receiving position, wherein the laser surveying system is configured to determine whether or not the laser beam received by the light receiving unit has been properly emitted from the rotational light emitting unit on the basis of a rotational position of the optical axis of the laser beam relative to the case and an angle of site of the laser beam relative to a reference plane including the optical axis.

BRIEF DESCRIPTION OF THE DRAWINGS

Features, embodiments, and advantages of the present invention will become apparent from the following detailed description with reference to the accompanying drawings:

FIG. 7 is a function block diagram of the structures of an emit-side controller 61 and a rotational angle detector 65 of the rotational light emitting unit 11;

DETAILED DESCRIPTION OF PREFERRED EMBODIMENT

Figure 1:
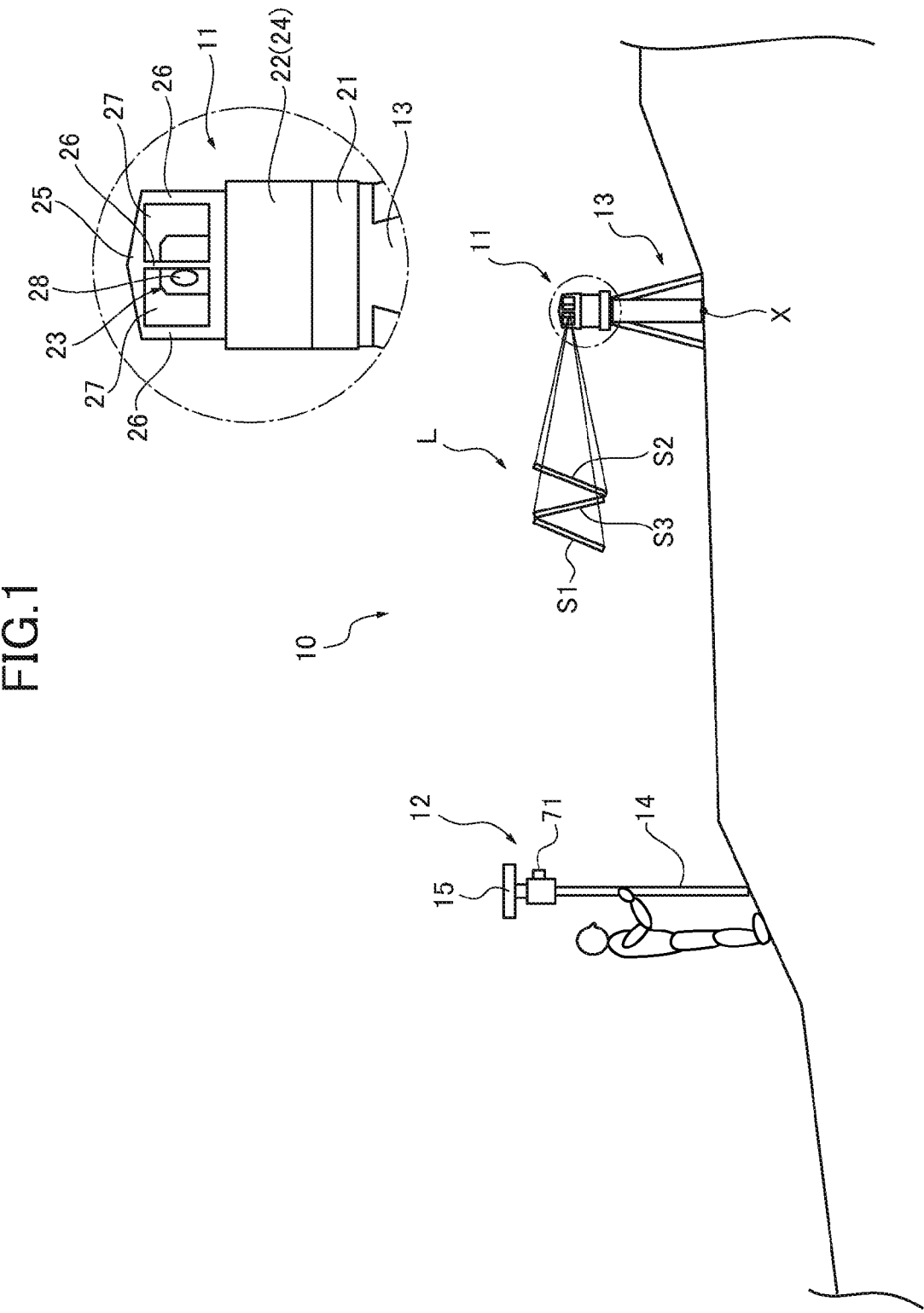
FIG. 1 shows a laser surveying system 10 according to one embodiment of the present invention.

Hereinafter, an embodiment of a laser surveying system will be described in detail with reference to the accompanying drawings FIG. 1 to FIG. 13. Wherever possible, the same reference numbers will be used throughout the drawings to refer to the same or like parts. A laser surveying system 10 according to the present embodiment comprises a rotational light emitting unit 11 and a light receiving unit 12 in FIG. 1. The rotational light emitting unit 11 is placed at a known point X and the light receiving unit 12 is placed in a desired surveying site. The laser surveying system 10 is configured that the rotational light emitting unit 11 rotates to emit a laser beam L at a constant speed and the light receiving unit 12 receives the laser beam L and calculates a light receiving signal, to survey the position of the light receiving unit 12 on the basis of the rotational light emitting unit 11 or known point X.

The rotational light emitting unit 11 is mounted on a tripod 13 at the known point X. It includes a base 21 as a mount on the tripod 13, a unit body 22 secured on the base 21, and a rotator 23 rotatably provided inside the unit body 22. The rotator 23 is rotated at a constant speed inside the unit body 22 to emit the laser beam L from a later-described pentaprism 54 (FIG. 3).

Figure 2:
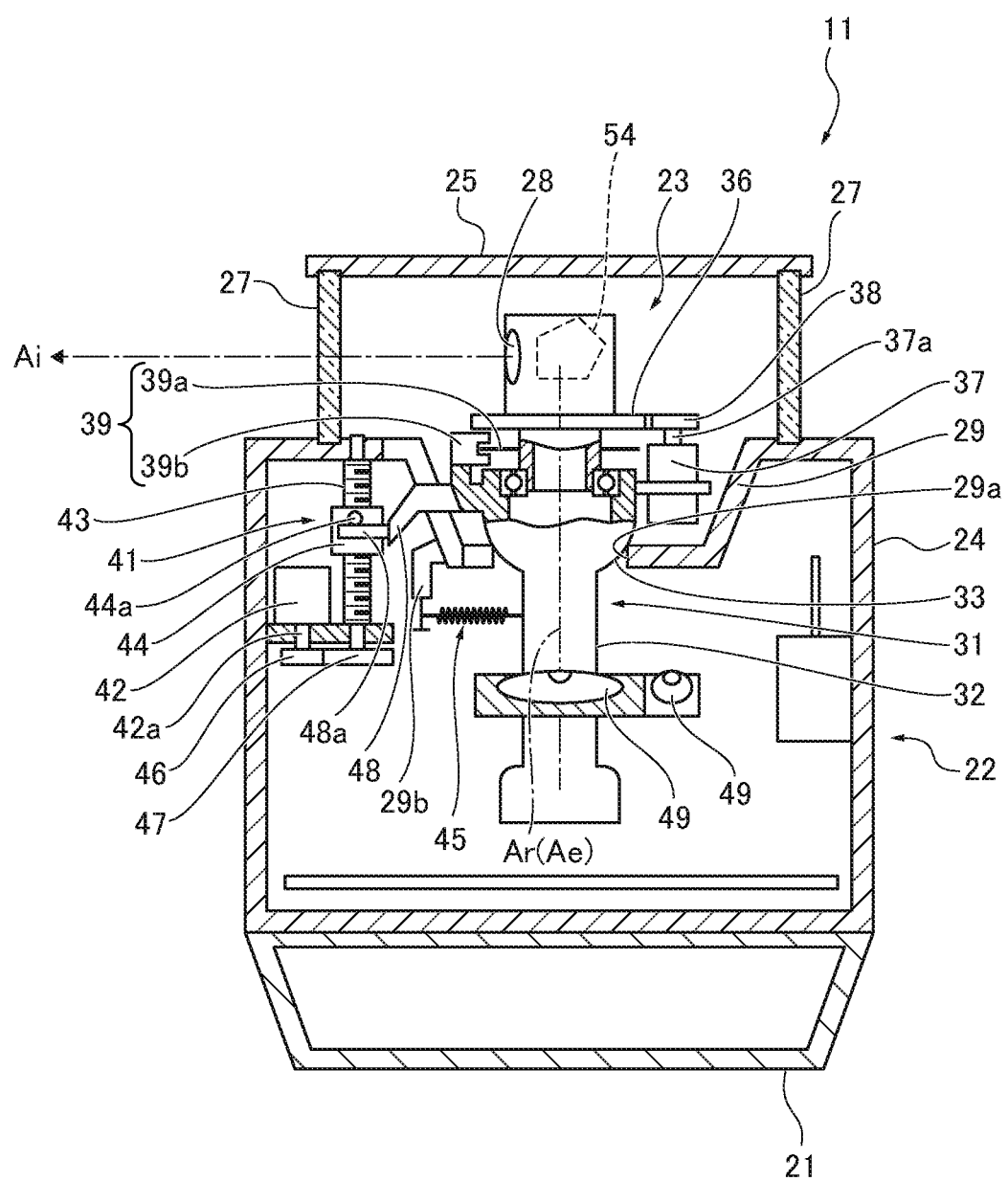
FIG. 2 is a cross section view of a rotational light emitting unit 11 of the laser surveying system 10.

In FIG. 2 the unit body 22 includes a tubular case 24 with a ceiling 25 to form the exterior of the unit body 22. The ceiling covers the rotator 23 for the purpose of waterproof and protecting the rotator 23 and is supported by four columns 26 disposed with an equal interval in the case 24.

The columns 26 extend along the central axis of the case 24 and are provided at the same positions relative to the central axis. Four cover members 27 are rectangular plates extending between the two adjacent columns 26 and made from a material through which the laser beam L is transmitted. They are provided to enclose the gap between the case 24 and the ceiling 25. The exit of the laser beam L from the beam emitter 31 is formed in the top part of the case 24.

Figure 3:
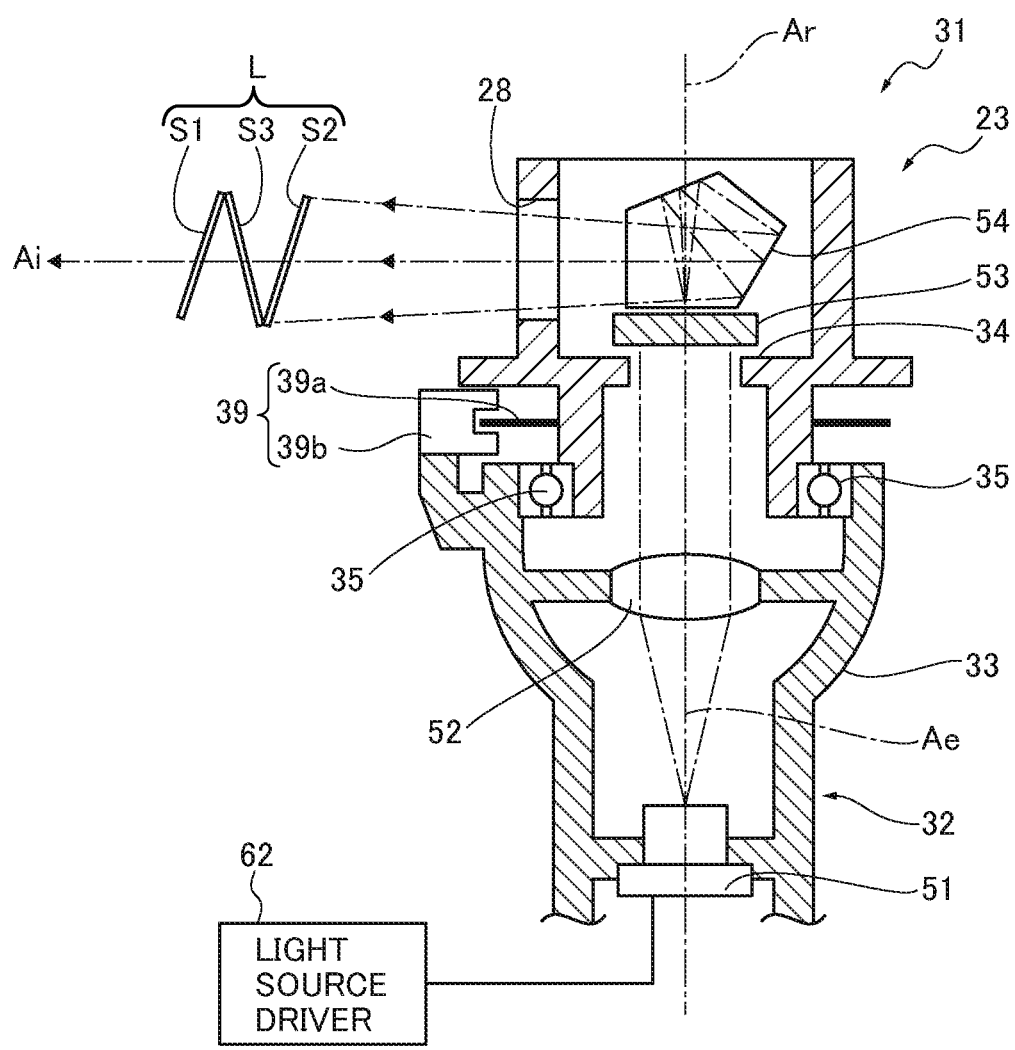
FIG. 3 is a cross section view of the structure of a beam emitter 31 of the rotational light emitting unit 11.

The rotator with a window 28 is accommodated in the case 24 with the window 28 aligned with the exit of the laser beam L, to emit the laser beam L through the window 28 to outside (FIG. 3). The case 24 includes a recess 29 in a truncated conical shape at the top center. The beam emitter 31 is provided in a vertical through hole 29a of the recess 29.

A housing 32 of the beam emitter 31 is a vertically long column and accommodates a later-described beam emitting structure and includes a spherical support 33 at the top. The spherical support 33 is tiltable relative to the case 24 and supported in the through hole 29a of the recess 29. The rotator 23 is placed at the top end of the housing 32.

Referring to FIG. 3, the tubular rotator 23 includes at the middle a small diameter plate 34 protruding inward. A diffraction grating 53 on which the laser beam L is incident is mounted on the small diameter plate 34. The bottom end of the rotator 23 is attached to the top end of the housing 32 via bearings 35 so that it can rotate around the central axis (optical axis Ae) of the housing 32. The central axis is the rotational axis Ar of the beam emitter 31 and the rotator 23.

The rotator 23 includes a scan gear 36 while the housing 32 includes a scan motor 37 with a shaft 37a in FIG. 2. The scan motor 37 is driven by a driver 63 (FIG. 4) under the control of an emit-side controller 61 to generate a rotational force via a shaft 37a. A drive gear 38 is attached to the shaft 37a of the scan motor 37 to engage with the scan gear 36 of the rotator 23. Thereby, the scan motor 37 is driven to rotate the rotator 23 about the rotational axis Ar relative to the housing 32.

Figure 8:
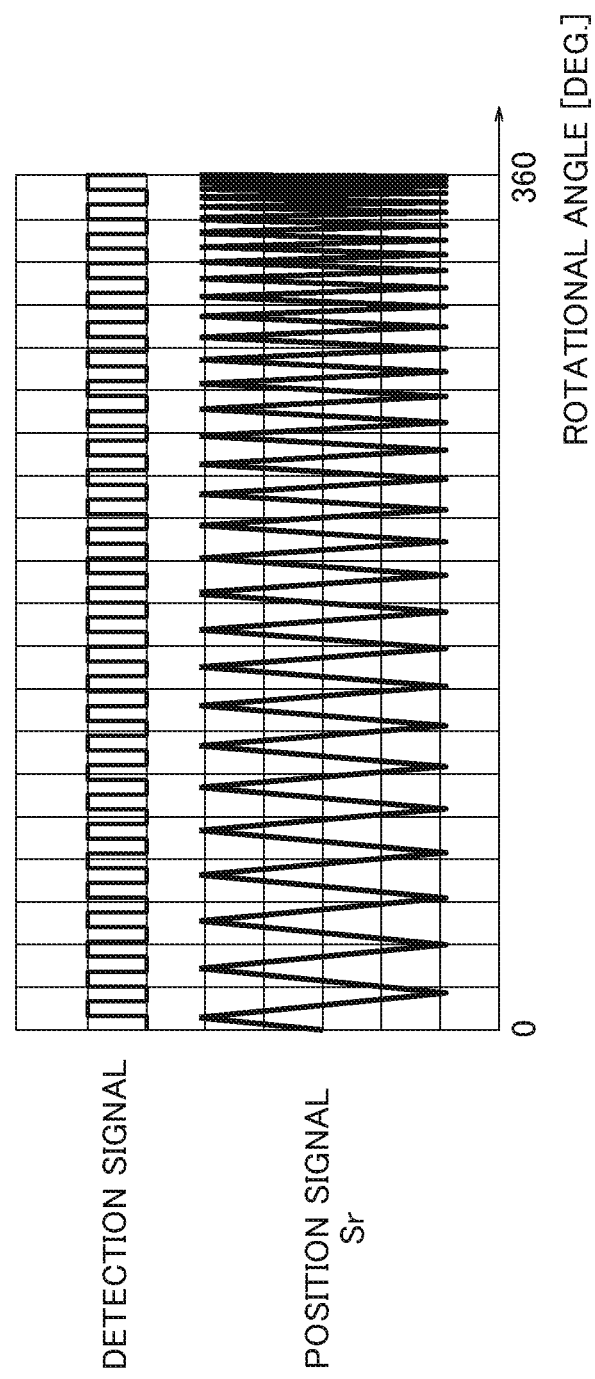
FIG. 8 is a graph showing a detection signal from an encoder 39 of the rotational angle detector 65 and a position signal from a position signal generator circuit 81 of the emit-side controller 61 by way of example.

The encoder 39 is provided between the rotator 23 and the housing 32 and includes a slit disc 39a provided in the rotator 23 and an optical detector 39b provided in the housing 32. The optical detector 39b has a pair of protrusions vertically placing a part of the slit disc 39a therebetween and detects a signal as light at one of the protrusions output from the other protrusion. The slit disc 39a is made from a material through which the signal is prevented from transmitting and has slits with a constant interval to allow the signal to transmit. Along with the rotation of the rotator 23 relative to the housing 32, the slit disc 39a is rotated relative to the optical detector 39b in the housing 32 to intermittently detect the signal through the slits of the slit disc 39a. Thus, the encoder 39 outputs a detection signal in a waveform as shown in FIG. 8 along with the rotation of the rotator 23.

Further, the case 24 includes a pair of tilt mechanisms 41 to control the amount and direction of tilt of the housing 32 relative to the case 24, although only one of them is shown in the drawings. As described above, the housing 32 is supported in the through hole 29a to be tiltable relative to the case 24. The pair of tilt mechanisms 41 are placed orthogonally to each other relative to the central axis of the case 24 on a plane orthogonal to the central axis. They have the same structure so that only one of the tilt mechanisms 41 is described in the following.

The tilt mechanism 41 comprises a motor 42, a screw 43, a nut 44, and a spring 45. The motor 42 with a shaft 42a is secured in the case 24 and driven by a tilt driver 64 in FIG. 4 under the control of the emit-side controller 61 to generate a rotational force via a drive gear 46 attached to the shaft 42a. The screw 43 is provided in parallel to the central axis to rotate relative to the case 24. A gear 47 attached to the screw 43 is engaged with the drive gear 46 of the shaft 42a of the motor 42.

The nut 44 is engaged with the screw 43 and prevented from rotating relative to the case 24. Along with the rotation of the screw 43, the nut 44 is moved vertically on the screw 43. The nut 44 includes a columnar pin 44a protruding in a direction orthogonal to the axis.

The spring 45 made of a wire is shrunk most under no load and exerts an elastic force against a force separating both ends thereof. The spring 45 extends between a bearing 29 on the recess of the case 24 and a position below the spherical support 33 of the housing 32. The central axis of the bearing 29b is aligned with the direction of the tilt mechanism 41 on a plane orthogonal to the central axis of the case 24.

The housing 32 is provided with a pair of tilt arms 48, protruding in a direction orthogonal to the central axis, although only one of them is shown. The pair of tilt arms 48 correspond to the pair of tilt mechanisms 41 and are aligned with each other. Each of the tilt arms 48 includes a pin 48a at an end, extending orthogonally to the pin 44a of the nut 44 to contact the pin 44a and slide with each other. The pin 48a is positioned below the pin 44a. When the housing 32 is pulled by the spring 45 and tilted relative to the case 24, the pin 48a is moved upward and pressed onto the pin 44a irrespective of the position of the nut 44 on the screw 43.

Thus, the tilt driver 64 drives the motor 42 to rotate the screw 43 via the drive gear 46 and gear 47. In accordance with the amount and direction of the rotation of the screw 43, the nut 44 is moved vertically to an arbitrarily position on the screw 43, to press the pin 48*a* of the tilt arm 48 and change the position of the tilt arm 48, thereby changing the tilting of the housing 32 relative to the case 24. Accordingly, the pair of tilt mechanisms 41 are controlled by the emit-side controller to adjust the amount and direction of the tilt of the housing 32.

Figure 4:
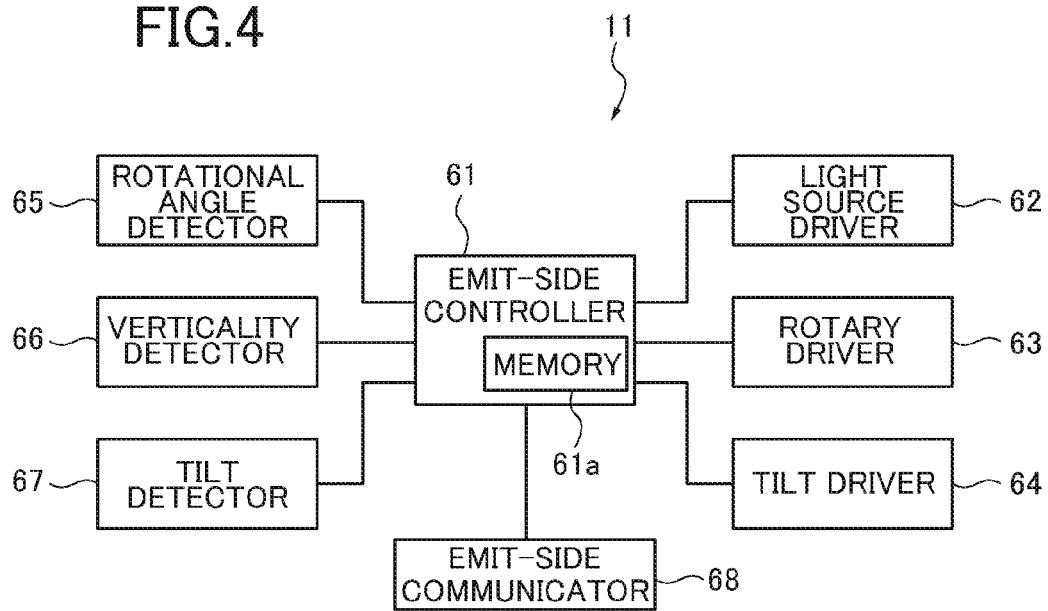
FIG. 4 is a function block diagram of the structure of the rotational light emitting unit 11.

The housing 32 is also provided with a pair of level sensors 49 which detect a horizontal state in two orthogonal directions, respectively and output detection signals to the emit-side controller 61 (FIG. 4). They are positioned so that when both of them detect the horizontal state, the central axis of the housing 32 becomes parallel to a vertical direction. Thus, the emit-side controller 61 controls the pair of tilt mechanisms 41 via the tilt driver 64 according to the detection signals from the level sensors, so that the housing 32 always stands vertically. Also, the emit-side controller 61 controls the housing 32 to tilt in an arbitrary direction at an arbitrary angle according to the detection signals from the level sensors 49.

The beam emitter 31 in the housing 32 generates the laser beam L and emits it on the irradiation axis Ai, as shown in FIG. 3. It comprises a beam generator 51 and a collimator lens 52 in the housing 32 and a diffraction grating 53 and a pentaprism 54 in the rotator 23.

The beam generator 51 is connected to a later-described light source driver 62 and secured in the housing 32 with the central axis of the housing 32 coinciding with the optical axis Ae. The emit-side controller 61 (FIG. 4) controls the light source driver 62 to drive the beam generator 51 to emit the laser beam L on the optical axis Ae, as described later. The collimator lens 52 is secured on the optical axis Ae in the housing 32 to convert the laser beam L to a parallel beam. The parallel beam travels through the small diameter plate 34 in the rotator 23.

The diffraction grating 53 is secured above the small diameter plate 34 and the pentaprism 54 is secured above the small diameter plate 34 in the rotator 23. The diffraction grating 53 is provided to divide the laser beam L from the collimator lens 52 into three beams S1 to S3. By the diffraction grating 53, when emitted from the window 28, the beams S1, S2 become parallel to each other with a certain interval and the beam S3 becomes inclined to the first and second beams S1, S2 therebetween on the plane orthogonal to the irradiation axis Ai. According to the present embodiment the beam S3 connects the top end of the beam S1 and the bottom end of the beam S2. Thus, the diffraction grating 53 is configured to convert the parallel beam as the laser beam L from the collimator lens 52 to be an N-shape beam on the plane orthogonal to the irradiation axis Ai. Herein, a binary optical element (BOE) is used for the diffraction grating 53. Note that the diffraction grating 53 can be disposed to transmit the parallel laser beam L changed in direction by the pentaprism 54.

The pentaprism 54 is provided to change the traveling direction of the beams S1 to S3 along the central axis of the housing 32 to a direction orthogonal thereto. That is, it functions to change the traveling direction of the laser beam L from the optical axis Ae to the irradiation axis Ai orthogonal to the optical axis Ae. The pentaprism 54 is placed in the rotator 23 so that the window 28 of the rotator 23 is positioned on the irradiation axis Ai.

Thus, the diffraction grating 53 and pentaprism 54 function to divide the laser beam L having traveled through the collimator lens 52 on the optical axis Ae and emit the beams S1 to S3 from the window 28 of the rotator 23 on the irradiation axis Ai. The pentaprism 54 (window 28) in the rotator 23 is an exit of the rotational light emitting unit 11. The beams S1 to S3 are converted by the diffraction grating 53 and pentaprism 54 to a fan beam expanding from the optical axis Ae with an equal divergence angle as shown in FIG. 1. They expand from the optical axis Ae but do not change the N-shape on the plane orthogonal to the irradiation axis Ai irrespective of a change in the distance from the optical axis Ae. That is, the N-shape of the three beams S1 to S3 changes in size in accordance with the change in the distance from the optical axis Ae. Since the diffraction grating 53 and pentaprism 54 are fixed in the rotator 23, the emit-side controller 61 controls the rotator 23 to rotate relative to the housing 32 at a constant speed, rotate the irradiation axis Ai relative to the case 24 at a constant speed, and emit the beams S1 to S3 as the laser beam L. The beams S1 to S3 travel with an equal time interval irrespective of a difference in the distance from the optical axis Ae.

Figure 5:
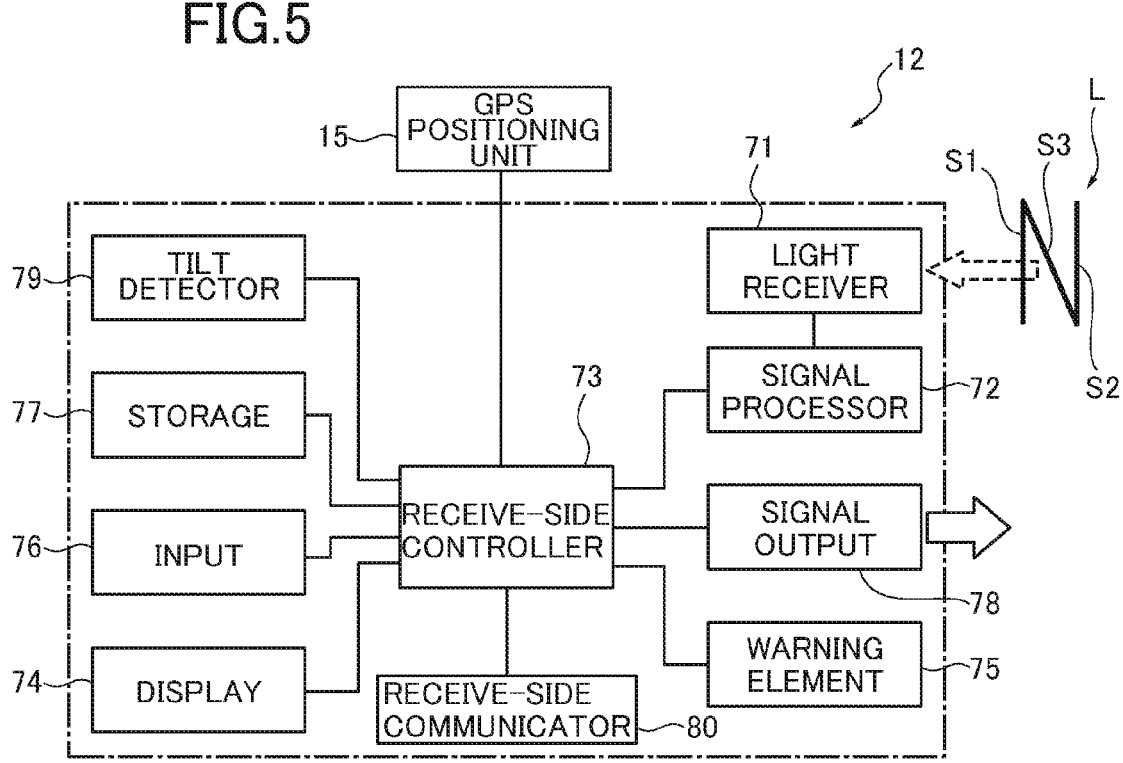
FIG. 5 is a function block diagram of the structure of a light receiving unit 12.

Referring to FIG. 4, the rotational light emitting unit 11 comprises the emit-side controller 61, light source driver 62, a rotary driver 63, a tilt driver 64, a rotational angle detector 65, a verticality detector 66, a tilt detector 67, and an emit-side communicator 68. The emit-side controller 61 integrally controls the driving of the light source driver 62, rotary driver 63, tilt driver 64, and emit-side communicator 68 by the program stored in the memory 61*a* on the basis of detection signals from the rotational angle detector 65, verticality detector 66, and tilt detector 67 and operations to a not-shown an operation unit. Specifically, it controls the rotational emission of the laser beam L, the position of the housing 32, superimposing communication information on the laser beam L, and communication with a receive-side controller 73 (FIG. 5). The light source driver 62, rotary driver 63, tilt driver 64, rotational angle detector 65, verticality detector 66, tilt detector 67, and emit-side communicator 68 are supplied with electric power from a not-shown power source via the emit-side controller 61 to execute their operations. Although not shown, the emit-side controller 61 is comprised of a substrate and electric elements such as condensers and resistances mounted on the substrate, and the substrate is secured in the case 24 (FIG. 2).

The light source driver 62 drives the beam generator 51 in FIG. 3 to superimpose communication information on the laser beam L and emit the laser beam L.

The rotary driver 63 drives the scan motor 37 (FIG. 2) inside the housing 32 to rotate the rotator 23 relative to the housing 32 via the drive gear 38 of the shaft 37*a* and the scan gear 36. The rotary driver 63 rotates the irradiation axis Ai of the beam emitter 31 relative to the housing 32 or case 24.

The tilt driver 64 drives the motors 42 of the pair of tilt mechanism 41 in the case 24 to adjust the amount and direction of tilt of the beam emitter 31 or the housing 32 relative to the case 24 (FIG. 2).

The rotational angle detector 65 detects a rotational position of the rotator 23 relative to the housing 32 and comprises the encoder 39 (FIG. 2) and a counter 69 (FIG. 7). The rotational position indicates in which of direction the irradiation axis Ai of the laser beam L from the rotator 23 is relative to a reference position of the housing 32 when the housing 32 is rotated about the central axis or rotational axis Ar. That is, it can be represented by a rotational angle between the irradiation axis Ai and the reference position and indicates the orientation of the laser beam L relative to the housing 32 or case 24 in the rotational direction. The encoder 39 outputs a detection signal with a waveform in FIG. 8 to the counter 69 along with the rotation of the rotator 23 relative to the housing 32. The counter 69 counts the number of waveforms of the detection signal from the encoder 39 from the rotational position of the rotator 23 and outputs a count signal to the emit-side controller 61 (FIG. 7). The emit-side controller 61 determines the rotational position of the rotator 23 relative to the housing 32 from the count signal.

The verticality detector 66 comprises the pair of level sensors 49 in FIG. 2 each of which detects a horizontal state. Both level sensors are set to detect a horizontal state when the housing 32 and the central axis extend vertically. The emit-side controller 61 can control the housing 32 to constantly stand vertically or tilt from a vertical direction at an arbitrary angle in an arbitrary direction by controlling the level sensors 49 to detect a horizontal state or a desired value.

The tilt detector 67 comprises a not-shown mechanism (for example, a combination of light emitter and light receiver) provided between the case 24 and housing 32 to detect a tilt of the housing 32 relative to the case 24. It can be arbitrarily structured as long as it can detect the tilt of the housing 32 relative to the case 24. For example, another pair of level sensors can be provided to detect the amount or direction of tilt of the housing 32 from a vertical direction and the tilt of the housing can be determined from the detection signals of another pair of level sensors and the level sensors 49.

The emit-side communicator 68 transfers information or data between the emit-side controller 61 and a receive-side controller 73 of the light receiving unit 12. According to the present embodiment the emit-side communicator 68 transmits, to the receive-side controller, tilt data on the housing 32 detected by the tilt detector 67 and positional data on the known point X at which the rotational light emitting unit 11 is installed.

Figure 6A:
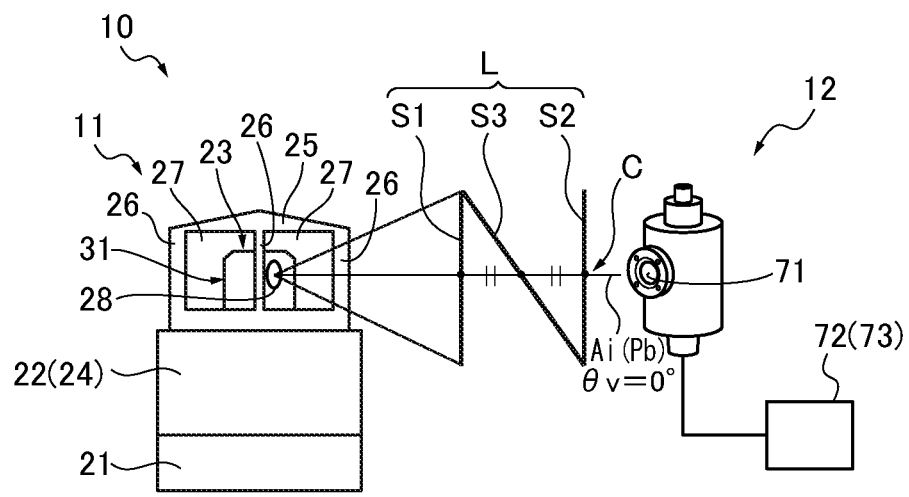
FIG. 6A shows surveying by the laser surveying system 10 when a light emitter of the rotational light emitting unit 11 and a light receiver 71 of the light receiving unit 12 are at the same height.

As configured above, in the rotational light emitting unit 11 the emit-side controller 61 controls the rotator 23 to rotate relative to the housing 32 and drive the beam generator 51 to rotationally emit three beams S1, S2, S3 as the laser beam L. Herein, a plane formed by the irradiation axis Ai of the rotator 23 in rotation about the rotational axis Ar of the housing 32 is defined to be a reference plane Pb of the rotational light emitting unit 11 (FIG. 6A). The reference plane Pb is parallel to a plane orthogonal to the rotational axis Ar of the beam emitter 31 which emits the laser beam L. The rotational light emitting unit 11 can emit the three beams S1, S2, S3 with the reference plane Pb set along the horizontal plane by adjusting the amount and direction of the housing 32 to place the beam emitter 31 in a vertical state. Accordingly, even if the case 24 on the tripod 13 is inclined at the known point X, the beam emitter 31 can stand vertically to emit the three beams with the reference plane Pb set along the horizontal plane. Further, the beam emitter 31 can be tilted at an arbitrary angle in an arbitrary direction by adjusting the amount and direction of tilt of the housing 32, to emit the three beams at an arbitrary angle in an arbitrary direction, as described above.

In the laser surveying system 10 the light receiving unit 12 is supported on a certain support member and placed in a desired position to receive the beams S1 to S3 for surveying, as shown in FIG. 1. FIG. 1 shows an example of using a handheld rod 14 for the support member. That is, an operator holds the rod 14 of which the light receiving unit 12 is mounted at a certain height and places the bottom end of the rod on a desired point. A GPS (Global Positioning System) positioning unit 15 is provided at the top end of the rod 14 in FIG. 1 to receive radio signals from a GPS satellite using the GPS for surveying. The support for the light receiving unit 12 should not be limited to the rod 14. Alternatively, a work tool of a constructing machine such as a blade of a bulldozer can be used as a support or the light receiving unit 12 can be fixed on a wall or the like.

The light receiving unit 12 comprises a light receiver 71, a signal processor 72, a receive-side controller 73, a display 74, a warning element 75, an input 76, a storage 77, a signal output 78, a tilt detector 79, and a receive-side communicator 80, as shown in FIG. 5.

The light receiver 71 comprises an aspheric lens with directivity of ±10 degrees and a Si photo diode, for example, to receive the three beams as the laser beam L from the rotational light emitting unit 11. The three beams S1 to S3 are incident on a light receiving surface of the Si photo diode via the aspheric lens. The light receiver 71 outputs, to the signal processor 72, a light receiving signal (FIG. 10A) indicating an analog value of intensity in accordance with a light amount received on the light receiving surface.

The signal processor 72 processes the light receiving signal of the three beams S1 to S3 from the light receiver 71, calculates a difference H (in FIG. 6C) in height between the reference plane Pb and the position of the light receiver 71 from the light receiving signal, and extracts, from communication information superimposed on the three beams, a rotational position of the rotator 23 relative to the housing 32 when the beams S1 to S3 are emitted. The signal processor 72 outputs calculated information to the receive-side controller 73.

The receive-side controller 73 acquires various information and signals such as calculated information by the signal processor 72, an operation signal from the input 76, a detection signal from the tilt detector 79, and information from the receive-side communicator 80. It integrally controls the driving of the light receiving unit 12 or calculation of surveying data based on the beams S1 to S3 and driving of the other elements in compliance with the program stored in the storage 77 or a not-shown built-in storage. Specifically, it determines handling of the beams S1 to S3 received at the light receiver 71 on the basis of information from the signal processor 72 and receive-side communicator 80, calculates positional data on a desired surveying point from the beams S1 to S3, and controls the displays on the display 74, warning of the warning element 75, and generation of output information from the signal output 78 according to the results of detection by the tilt detector 79 and operations to the input 76. These elements 71, 72 and 74 to 80 are supplied with power from a power source via the receive-side controller 73. The receive-side controller 73 is comprised of a substrate and electric elements such as condensers and resistances mounted on the substrate, and the substrate is secured in the housing of the light receiving unit 12.

The display 74 displays various kinds of information such as absolute positions detected by the GPS positioning unit 15 on the rod 14, positional data and height of the light receiving unit 12, exit positions of the laser beam L from the rotational light emitting unit 11, angle of site $\theta v$ (FIGS. 6A to 6D) between the light receiver 71 of the light receiving unit 12 and the reference plane Pb, and tilt data on the rod 14 from the tilt detector 79.

The warning element 75 issues buzzing sound for warning an operator when the beams S1 to S3 are not received at the light receiver 71, that is, the light receiver 71 is outside the irradiation area of the beams S1 to S3.

The input 76 comprises various switches with which an operator manipulates to input information and set or execute the operation of the light receiving unit 12. In place of the input 76, the display 74 can be provided with a touch panel used as the input 76.

The storage 77 contains various kinds of information which is written or read via the receive-side controller 73. The information includes one for calculating the angle of site $\theta v$, communication information superimposed on the beams S1 to S3, the absolute positions detected by the GPS positioning unit 15 on the rod 14, positions and heights of the light receiving unit 12, the angle of site θv between the light receiver 71 of the light receiving unit 12 and the reference plane Pb 31, and tilt data on the rod 14 from the tilt detector 79.

The signal output 78 outputs the signals and surveying data obtained by the receive-side controller 73 to a not-shown exterior device which uses them on a display. Further, they are used for controlling a construction machine via the exterior device.

The tilt detector 79 detects a tilt angle of the rod 14 supporting the light receiving unit 12 and generates a signal indicating the tilt angle and outputs it to the receive-side controller 73.

The receive-side communicator 80 allows data transfer between the receive-side controller 73 and the emit-side controller 61 of the rotational light emitting unit 11 via the emit-side communicator 68. According to the present embodiment the receive-side controller 73 receives tilt data of the housing 32 relative to the case 24 and positional data on the known point X from the emit-side controller 61.

Next, the surveying with the laser surveying system 10 is described. First, an operator places the rotational light emitting unit 11 on the tripod 13 at the known point X, as shown in FIG. 1. It is assumed that the reference plane Pb of the rotational light emitting unit 11 is set to be parallel to a horizontal plane. The emit-side controller 61 in FIG. 4 controls the pair of tilt mechanism 41 so that the level sensors 49 both detect a horizontal state and the beam emitter 31 is in a vertical position. Thus, the rotational light emitting unit 11 rotationally emits the three beams S1 to S3 along the reference plane Pb parallel to the horizontal plane.

The operator holds the bottom end of the rod 14 supporting the light receiving unit and places it at a target position. The height of the light receiving unit 12 from the ground is known since it is attached at a predetermined position of the rod 14. The operator then allows the light receiver 71 of the light receiving unit 12 to receive the laser beam L or three beams S1 to S3 from the rotational light emitting unit 11. It is not necessary to accurately position the light receiver 71 since even a point light element can receive the three fan beams S1 to S3. The receive-side communicator 80 of the light receiving unit 12 acquires positional data of the known point X from the emit-side controller 61 via the emit-side communicator 68 and stores it in the storage 77. Alternatively, the operator can input the positional data of the known point X with the input 76 of the light receiving unit 12. The light receiving unit 12 acquires absolute position of the rod 14 in horizontal direction and absolute position thereof including absolute height of the GPS positioning unit 15 from the positioning data of the GPS positioning unit 15. The positioning data of the GPS positioning unit 15 is not sufficient to obtain precise height data. Because of this, the rotational light emitting unit 11 installed at the known point X and the light receiving unit 12 installed at a target position are used for surveying.

The horizontal position of the light receiving unit 12 can be found on the basis of the known positional relation between the GPS positioning unit 15 and light receiving unit 12 and the positional data of the GPS positioning unit 15. The height of the light receiving unit 12 can be found by calculating the position of height of the light receiver 71 relative to the reference plane Pb in accordance with the beams S1 to S3, for example, as follows.

Figure 6B:
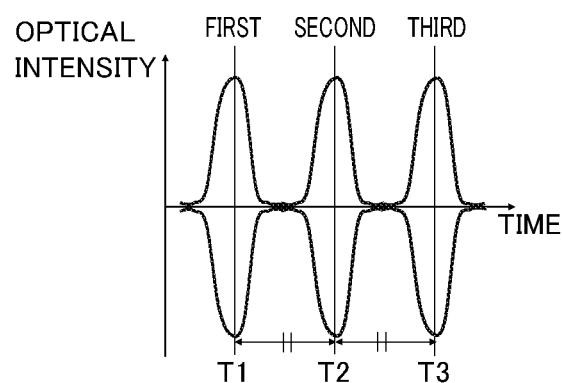
FIG. 6B shows the light receiving by the light receiving unit 12 in FIG. 6A.

When the vertical center of the light receiver 71 completely coincides with the irradiation axis Ai of the rotational light emitting unit 11 (angle of site θv=0), as shown in FIG. 6A, the light receiving unit 12 receives the vertical center C of the beams S1 to S3. The angle of site θv refers to an angle between the center of the light receiver 71 and the exit (pentaprism 54) of the rotational light emitting unit 11 relative to the reference plane Pb or irradiation axis Ai. The light receiving unit 12 outputs light receiving signals corresponding to the beams S1, S3, S2 with an equal time interval, as shown in FIG. 6B.

Figure 6C:
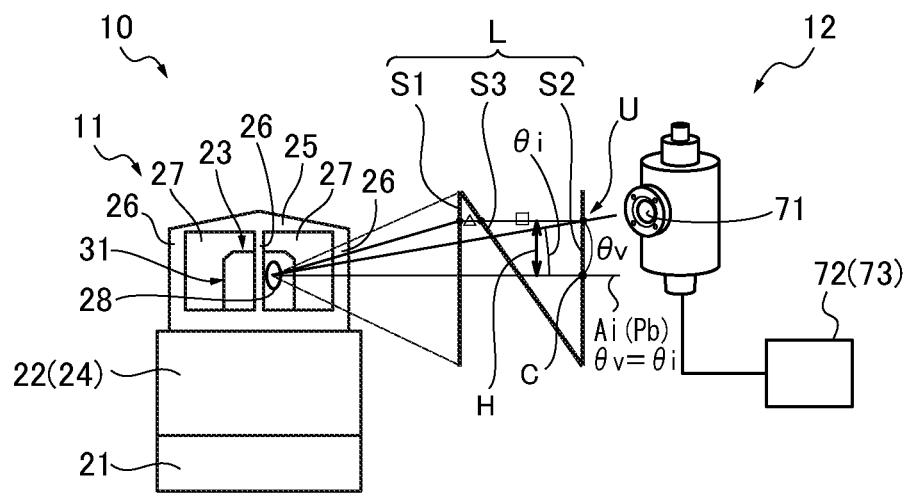
FIG. 6C shows the surveying when the light receiver 71 is at a higher position than the light emitter.
Figure 6D:
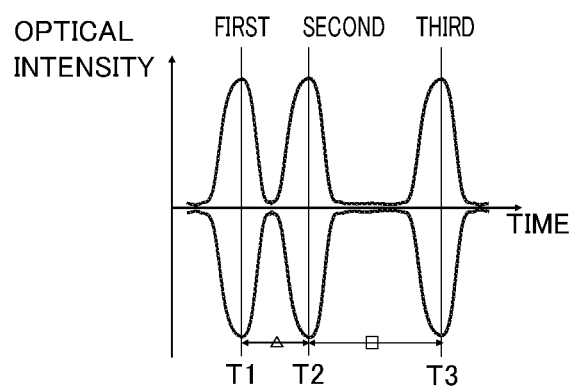
FIG. 6D shows the light receiving by the light receiving unit 12 in FIG. 6C.

Meanwhile, when the center of the light receiver 71 is above the exit (irradiation axis Ai and reference plane Pb) of the rotational light emitting unit 11 by an exit angle of θi (angle of site θv=θi), as shown in FIG. 6C, the light receiving unit 12 receives the position U of the laser beam L over the center by the angle θi. Then, the light receiving unit 12 outputs light receiving signals corresponding to the beams S1, S3, S2 with different time intervals according to the position U.

The three beams S1 to S3 are formed in N-shape on a plane orthogonal to the irradiation axis Ai. Because of this, when the center of the light receiver 71 is below the exit position of the rotational light emitting unit 11, the time intervals of the light receiving signals are reversed. Further, the N-shape of the three beams S1 to S3 is relatively changed in size in accordance with a change in the distance from the optical axis Ae so that irrespective of a change in the distance from the optical axis Ae, a relation between the time differences and the angle of site θv or exit angle θi is unchanged. Thus, by accurately measuring the time intervals of the three beams S1 to S3, it is able to precisely calculate the angle of site θv between the exit position of the rotational light emitting unit 11 and the light receiving position as the center of the light receiver 71. The light receiving unit 12 includes an angle of site detecting circuit 92 which is controlled by the receive-side controller to calculate the angle of site θv.

The light receiving unit 12 can obtain a distance and an orientation between the known point X and light receiving unit 12 according to the positional data on the known point X in the storage 77 and horizontal position data of the light receiving unit 12 measured by the GPS positioning unit 15. With a tilt of the rod 14 placed by the operator, the tilt detector 79 in FIG. 5 detects the tilt angle of the rod 14 and corrects the distance between the known point X and the light receiving unit 12 on the basis of the detected tilt angle. The rotational light emitting unit 11 rotates to emit the laser beam L along the reference plane Pb.

Thus, the light receiving unit 12 can calculate the difference H in height between the light receiver 71 and the reference plane Pb on the basis of the calculated angle of site θv and the distance and orientation between the light receiving unit 12 and the rotational light emitting unit 11. Accordingly, the laser surveying system 10 can measure the difference in height H between the two units without elevating or lowering the light receiving unit 12, and calculate surveying data including a height of a target position according to the positional data of the known point X, distance and orientation between the known point X and the light receiving unit 12, difference in height H, positional relation between the known point X and the exit of the rotational light emitting unit 11. Thus, the laser surveying system 10 can survey a target position according to positioning information from the GPS positioning unit 15 and three beams S1 to S3.

Next, the features of the structure of the laser surveying system 10 are described. In this system 10 the rotational light emitting unit 11 superimposes data on the rotational position of the rotator 23 relative to the housing 32 on the laser beam L. The light receiving unit 12 then detects the state of the laser beam L received at the light receiver 71 and determines how to handle the laser beam L according to the detected state.

First, the data superimposition of the emit-side controller 61 of the rotational light emitting unit 11 is described. The emit-side controller 61 comprises a position signal generator circuit 81, a carrier wave generator circuit 82, and an output signal generator circuit 83 in FIG. 7. The emit-side controller 61 sets a carrier frequency and modulates a carrier wave with the set frequency in accordance with a signal as communication information to superimpose the communication information on the laser beam L. Thereby, the frequency characteristic of the signal processor 72 of the light receiving unit 12 can be decreased.

The rotational position signal generator circuit 81 is connected to the rotational angle detector 65 to generate a position signal Sr for output according to a count signal from the rotational angle detector 65. The position signal Sr indicates the rotational position of the rotator 23 relative to the housing 32, that is, the rotational angle between the irradiation axis Ai and the reference position. The rotational position signal generator circuit 81 includes a DAC (DA converter) 81a and a VCO (Voltage Controlled Oscillator) 81b. The DAC 81a converts a digital count signal from the counter 69 of the rotational angle detector 65 to an analog count signal and outputs it to the VCO 81b. The VCO 81b varies an oscillation frequency with a change in the voltage of the count signal from the DAC 81a, as shown in FIG. 8 and generates the position signal Sr with the varied frequency. The position signal Sr has a frequency which continuously varies from 0 or more to less than 360 degrees relative to the reference position since the rotational position is represented by the rotational angle between the reference position and the irradiation axis Ai. The frequencies are associated with the rotational angles relative to the reference position on one-to-one basis. The VCO 81b outputs the position signal Sr to the output signal generator circuit 83.

The carrier wave generator circuit 82 generates a carrier wave in a frequency band set in the rotational light emitting unit 11 and used for carrying the position signal Sr, and outputs it to the output signal generator circuit 83. The frequency band set in the rotational light emitting unit 11 matches the frequency characteristic of the signal processor 72 of the light receiving unit 12. The frequency of the carrier wave is different from that of the position signal Sr.

The output signal generator circuit 83 comprises a synthesizer 83a and synthesizes the position signal Sr from the rotational position signal generator circuit 81 with the carrier wave from the carrier wave generator circuit 82 and generates a carrier wave as an output signal.

The synthesizer 83a receives the carrier wave with the above frequency band from the carrier wave generator circuit 82 and superimposes the position signal Sr from the rotational position signal generator circuit 81 on the carrier wave.

The output signal generator circuit 83 generates the carrier wave having the position signal superimposed and outputs it to the light source driver 62. The emit-side controller 61 performs data superimposition as described above. Alternatively, the emit-side controller 61 can be configured to superimpose, on the carrier wave, a signal with a different frequency band from that of the position signal in addition to the position signal Sr. For example, a channel signal for identifying the rotational light emitting unit 11 emitting the laser beam L can be used.

Upon receipt of the carrier wave, the light source driver 62 modulates the amplitude or intensity of the laser beam L according to the carrier wave and the superimposed position signal Sr and drives the beam generator 51 to emit the modulated laser beam L. The beam emitter 31 outputs the three beams in accordance with the carrier wave on which the position signal Sr is superimposed. The position signal Sr indicates the rotational position of the rotator 23, that is, the direction of the irradiation axis Ai when the beams S1 to S3 are emitted. Thus, the rotational light emitting unit 11 can acquire from the position signal Sr the rotational position of the rotator 23 relative to the housing 32 or the orientation of the irradiation axis Ai when the beams S1 to S3 are emitted.

Figure 9:
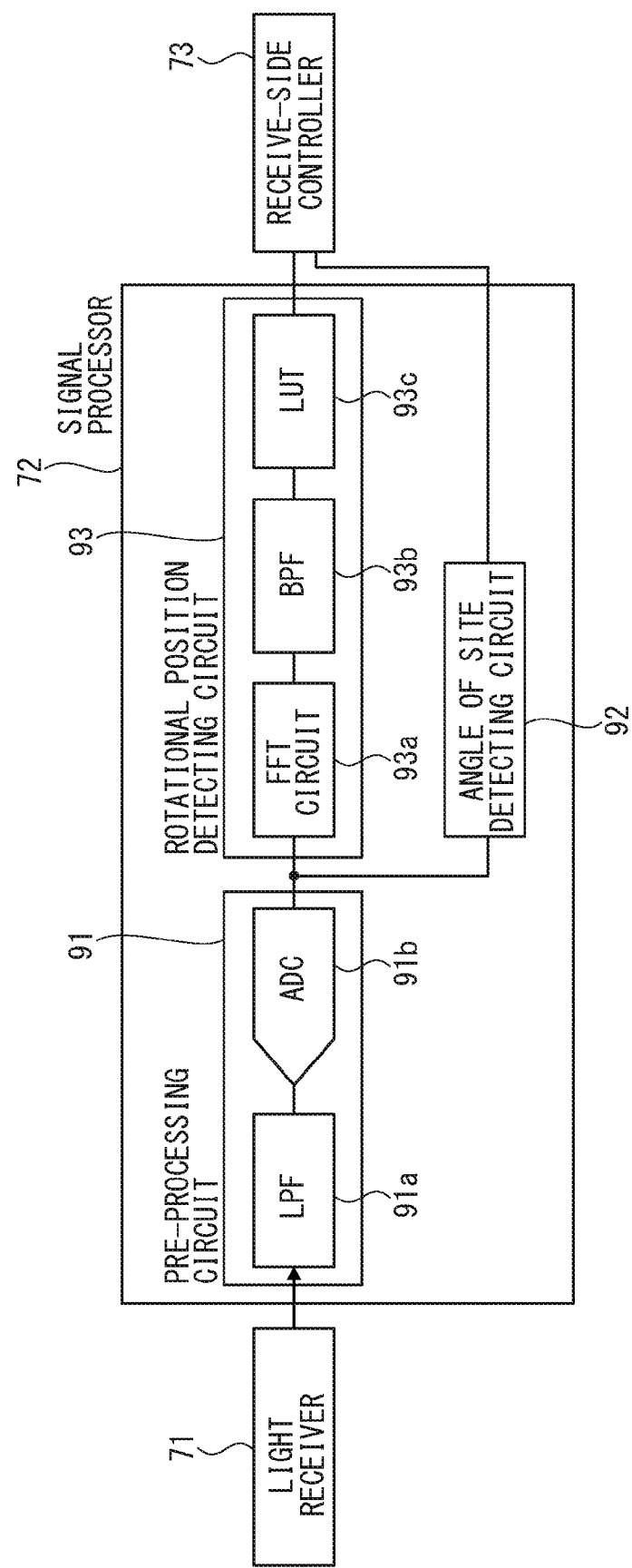
FIG. 9 is a function block diagram of the structure of a signal processor 72 of the light receiving unit 12.
Figure 10A:
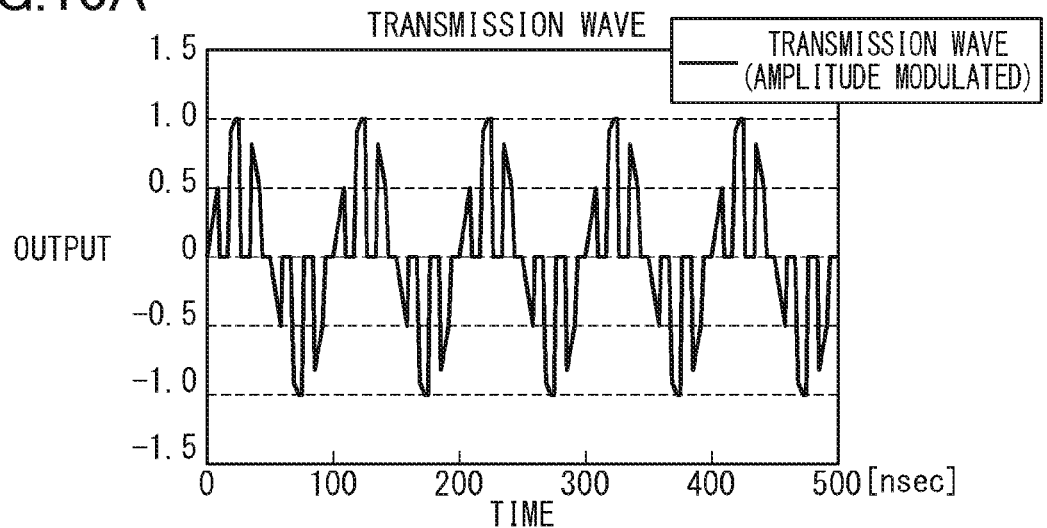
FIG. 10A is a graph showing a variation in a light receiving signal from the light receiver 71 in light detection by the signal processor 72.
Figure 10B:
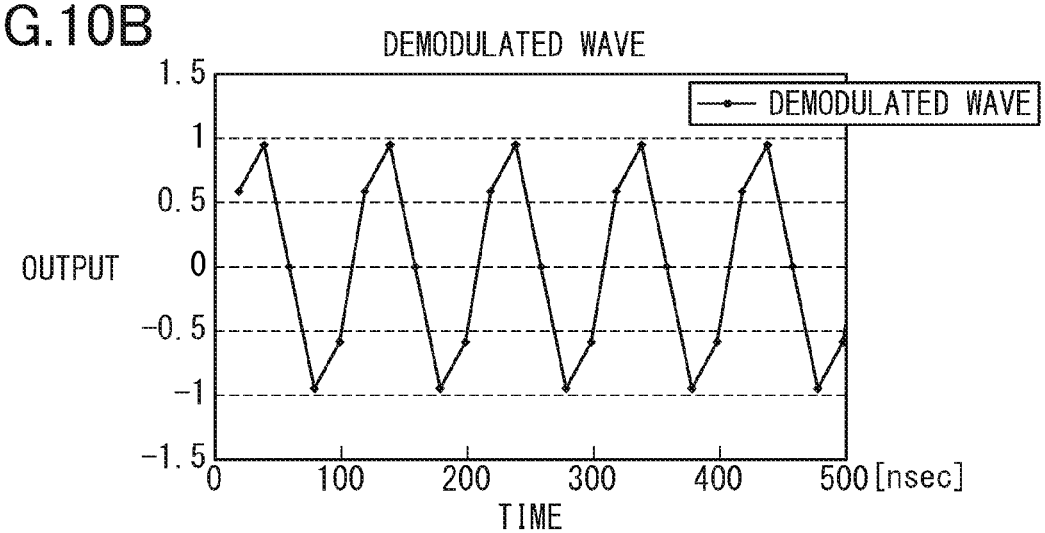
FIG. 10B is a graph showing a light receiving signal digitalized by an ADC 91b.
Figure 10C:
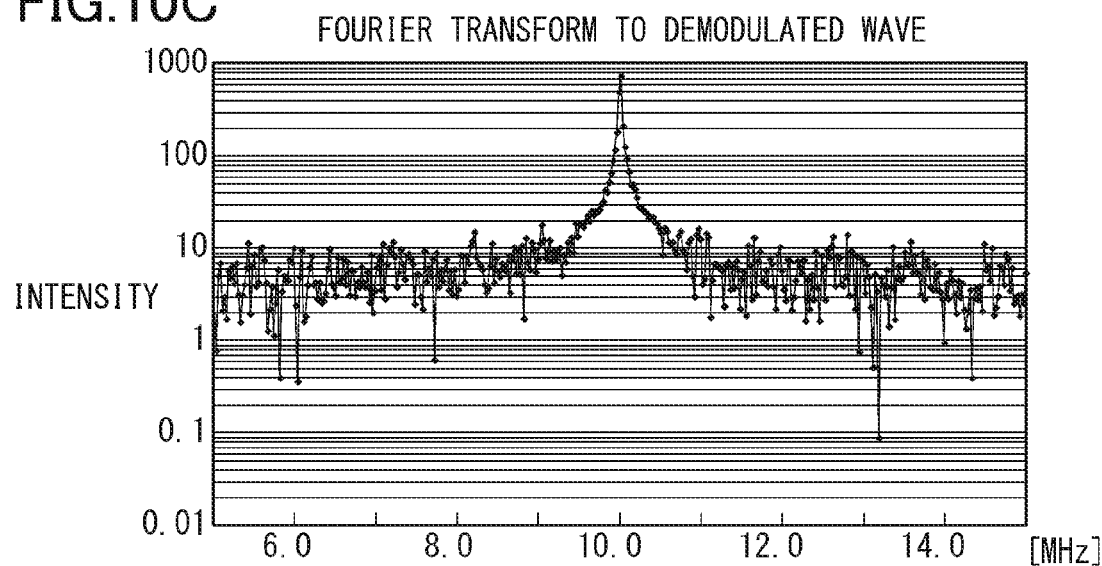
FIG. 10C is a graph showing a ratio of the frequency components of the light receiving signal.

To acquire the position signal Sr, the signal processor 72 detects the state of the beams S1 to S3 received by the light receiver 71. It comprises a pre-processing circuit 91, an angle of site detecting circuit 92, and a rotational position detecting circuit 93, as shown in FIG. 9. Upon receiving the light receiving signal of the beams S1 to S3, the signal processor 72 acquires the rotational position of the rotator 23 when the beams S1 to S3 are emitted, the angle of site $\theta v$ between the reference plane Pb, and the target position. Thus, the state of the beams S1 to S3 refers to the rotational position or rotational angle and the angle of site $\theta v$.

The pre-processing circuit 91 receives the light receiving signal (FIG. 10A) of the beams S1 to S3 from the light receiver 71. It removes unnecessary components from the light receiving signal for the subsequent processes of the angle of site detecting circuit 92 and rotational position detecting circuit 93. It comprises a LPF (Lowpass Filter) 91a and an ADC (AD Converter) 91b. The LPF 91a removes frequency components over a certain frequency from the light receiving signal and the ADC 91b converts the analog light receiving signal to a digital signal (FIG. 10B) and outputs it to the angle of site detecting circuit 92 and rotational position detecting circuit 93. A sampling cycle of the ADC 91b is set according to the frequency band of the carrier wave of the rotational light emitting unit 11 to decrease a frequency characteristic of the ADC 91b. The pre-processing circuit 91 demodulates the noise-removed light receiving signal with the ADC 91b.

The angle of site detecting circuit 92 calculates the angle of site $\theta v$ of the light receiving unit 12 relative to the reference plane Pb on the basis of the light receiving signal from the pre-processing circuit 91. It outputs the calculated angle of site $\theta$ (FIGS. 6A to 6D) to the receive-side controller 73.

The rotational position detecting circuit 93 calculates the rotational angle between the irradiation axis Ai of the beams S1 to S3 and the reference position in the rotational direction according to the light receiving signal from the pre-processing circuit 91. It calculates the rotational position of the rotator 23 relative to the housing 32 by extracting the position signal Sr from the light receiving signal. The rotational position detecting circuit 93 comprises a FFT (Fast Fourier Transform) circuit 93a, a BPF (Band Pass Filter) 93b, and a LUT (Lookup Table) 93c.

The FFT circuit 93a performs Fourier transformation to the light receiving signal as a demodulated wave from the ADC 91b, calculates a ratio of frequency components of the light receiving signal (FIG. 10C), and outputs it to the BPF 93b.

The BPF 93b transmits only the components in a certain frequency band from the light receiving signal from the FFT circuit. The frequency band thereof is set to be that of the position signal Sr superimposed on the carrier wave. Upon receiving the light receiving signal from the FFT circuit 93a, the BPF 93b transmits only the frequency components with the frequency band of the position signal Sr.

The LUT 93c outputs an angle corresponding to an input frequency. It contains rotational angles in association with the frequencies of the position signal Sr which correspond to the rotational angles relative to the reference position. It detects a peak frequency with the largest intensity from the ratio of the frequency components of the light receiving signal and extracts the frequency of the position signal Sr. The LUT 93c finds the angle corresponding to the extracted frequency to calculate the rotational angle between the irradiation axis Ai of the beams S1 to S3 and the reference position. The rotational angle indicates the rotational position of the rotator 23 relative to the housing 32 when the beams S1 to S3 are emitted.

Thus, in the rotational position detecting circuit 93 the FET circuit 93a finds the ratio of frequency components of the light receiving signal from the ADC 91b of the pre-processing circuit 91, the BPF 93b extracts the frequency band corresponding to the position signal Sr therefrom, and the LUT 93c extracts the position signal Sr to calculate the rotational position of the rotator 23 or the rotational angle between the irradiation axis Ai and the reference position. The rotational position detecting circuit 93 outputs the rotational angle to the receive-side controller 73.

Thus, the signal processor 72 can obtain the rotational position of the irradiation axis Ai of the beams S1 to S3 received at the light receiver 71 relative to the case 24 and the angle of site θv between the beams S1 to S3 and the reference plane Pb. The operations of the pre-processing circuit 91, angle of site detecting circuit 92, and rotational position detecting circuit 93 are to detect the state of the beams S1 to S3 received.

The light receiving unit 12 determines how to handle the received beams S1 to S3 on the basis of the state of the beams. First, a situation that the rotational light emitting unit 11 cannot accurately perform surveying using the beams S1 to S3 is described, referring to FIGS. 11A to 11C and FIGS. 12A to 12D. For better understanding the spreading of the beams S1 to S3 and the tilt of the housing 32 relative to the case 24 are exaggerated in FIGS. 11B and 11C, respectively. FIGS. 12A to 12D show a light shielding area As of only one of the four columns 26 since the light shielding areas of all the columns are shifted in the same manner in accordance with the amount and direction of the tilt of the housing 32 relative to the case 24.

Figure 11C:
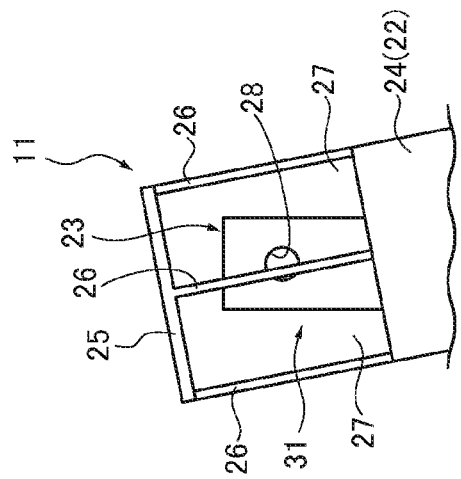
FIG. 11C shows the same when the housing 32 is tilted to the case 24.
Figure 11B:
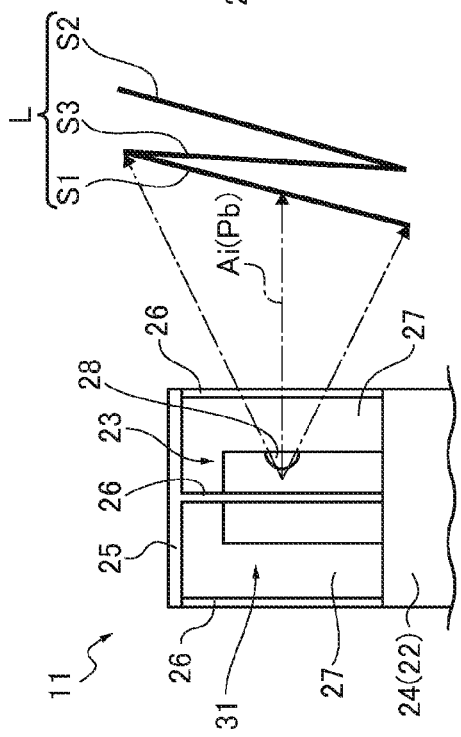
FIG. 11B shows the same as seen from a direction orthogonal to an irradiation axis Ai.
Figure 11A:
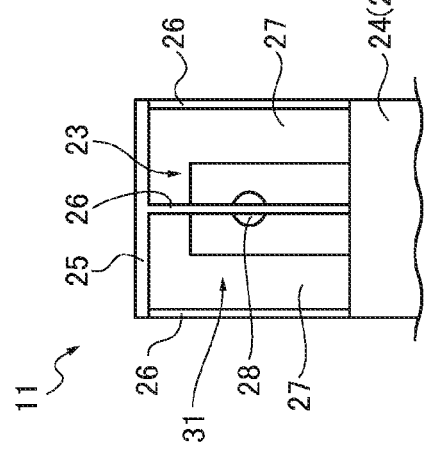
FIG. 11A shows a change in the exit position of the beam emitter 31 relative to columns 26 when a housing 32 is not tilted to a case 24.

The exit position of the laser beam L from the laser emitter 31 is the pentaprism 54 (window 28) in the rotator 23 which is positioned at the top of the case 24 below the ceiling 25. Because the cover members 27 are provided for the columns 26 (FIGS. 1 and 2), the laser beam L from the pentaprism 54 may be blocked by any of the four columns 26 in the rotary direction of the rotator 23 so that the rotational light emitting unit 11 cannot properly emit the laser beam L, as shown in FIGS. 11A, 11B. The irradiation axis Ai of the laser beam L in rotation passes across the columns 26. Therefore, when the light receiving unit 12 receives the laser beam L emitted from a certain area blocked by the columns 26, that is, light shielding area (in FIGS. 12A, 12B), the laser surveying system 10 cannot maintain the accuracy of surveying according to the received light.

According to the present embodiment the light shielding area As is defined by the rotational position or rotational angle (horizontal angle in the present embodiment) of the irradiation axis Ai and the angle of site θv thereof relative to the reference plane Pb for the reasons below. The light shielding area As is decided by the positional relationship between each column 26 and the exit of the beam emitter 31 in rotation, and it is basically set in a certain angle range from a reference position (0 degree, for example) at which each column 26 is placed. Also, the light shielding area As is changed in accordance with a change in the angle of site θv between the three beams S1 to S3 and the irradiation axis Ai even when the rotational position of the rotator 23 relative to the housing 32 is unchanged, referring to FIG. 12A. For example, when the housing 32 is not tilted in FIG. 11A, at the angle of site θv being 0, the angle range in the rotational direction is smallest and the larger the absolute value of the angle of site θv, the larger the angle range. This is because the distance between the laser beam L and each column 26 is smallest when the laser beam L is traveling on the irradiation axis Ai, and the distance is increased as the laser beam L is traveling upward or downward from the irradiation axis Ai, as shown in FIG. 11B.

Figure 12A:
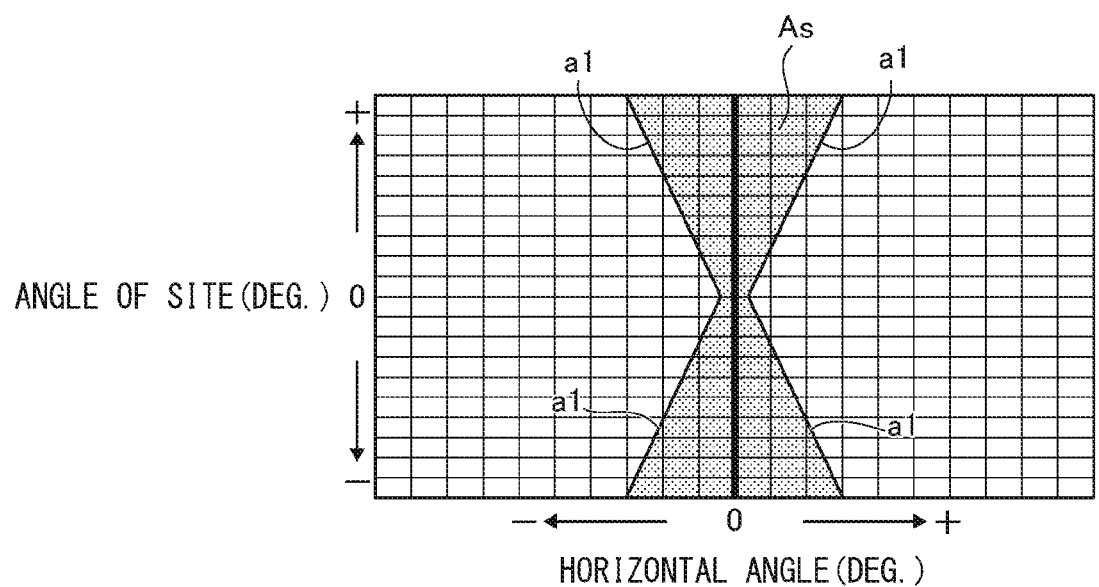
FIG. 12A is a graph of a light shielding area As when the housing 32 is not tilted relative to the case 24.
Figure 12B:
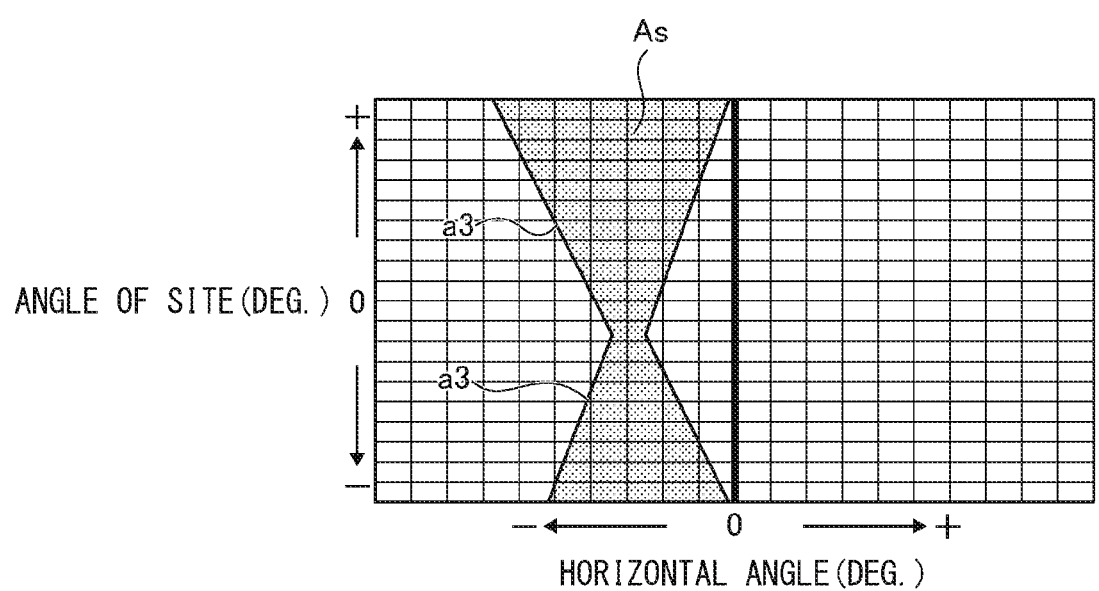
FIG. 12B is a graph of the same when the housing 32 is tilted relative to the case 24.

Further, the light shielding area As is shifted in accordance with a tilt of the housing 32 relative to the case 24, as shown in FIG. 12B. For example, referring to FIG. 11C, if the beam emitter 31 extends vertically in the tilted case 24, it is obvious that the positions of the columns 26 relative to the window 28 of the rotating beam emitter 31 are changed. In FIG. 12B the light shielding area As is shifted relative to the column 26 in the opposite direction to a direction in which the window 28 is moved and a relation between a change in the angle of site θv and a change in the rotational angle range is also shifted. The shifting of the light shielding area As is changed in accordance with a change in the position of the window 28 relative to the columns 26. Thus, the light shielding area As in the positions of the four columns 26 in the rotary direction is set by the direction and amount of tilt of the beam emitter 31 or housing 32 relative to the case 24.

Accordingly, the light receiving unit 12 can obtain the light shielding area As in the vicinity of at least the four columns 26 in the rotational direction from data on the state of tilt of the housing 32. In the laser surveying system 10 a number of light shielding areas As are preset in association with the tilts of the housing 32 relative to the case 24 and stored in the storage 77 of the light receiving unit 12. The emit-side controller 61 of the rotational light emitting unit 11 transmits the state of tilt of the housing 32 detected by the tilt detector 67 to the receive-side controller 73 of the light receiving unit 12 via the emit-side communicator 68 in FIG. 4 and receive-side communicator 80 in FIG. 5. Then, the receive-side controller 73 can obtain a light shielding area As corresponding to a tilt state of the housing 32 from the storage 77.

The receive-side controller 73 of the light receiving unit 12 determines how to handle the beams S1 to S3 received by the light receiver 71 according to a program stored in the storage 77 or a not-shown built-in memory. This operation is described referring to the flowchart in FIG. 13. The operation starts in accordance with a manipulation of the input 76. The receive-side controller 73 obtains a tilt state of the housing 32 relative to the case 24 and reads a light shielding area As corresponding to the tilt state from the storage 77 before a start of the operation. Herein, it is assumed that the central axis of the case 24 extends vertically, the housing 32 is not inclined relative to the case 24, and the light shielding area As shown in FIG. 12A is selected.

In step S1 the light receiver 71 receives the laser beam L and outputs a light receiving signal to the signal processor 72.

In step S2 the light receiving unit 12 detects the state of the laser beam L, that is, the rotational position of the irradiation axis Ai of the laser beam L and the angle of site θ thereof relative to the reference plane Pb.

In step S3 the light receiving unit 12 determines whether or not the laser beam L is in the light shielding area As from the detected state of the laser beam L, that is, rotational position and angle of site θv. The graph of FIG. 12A shows the light shielding area As of one of the columns 26 at the front in FIGS. 11A to 11C. The receive-side controller 73 acquires information on the rotational angle of the column 26 in question relative to the reference position of the rotational light emitting unit 11. The information on the rotational angles of the four columns 26 can be pre-stored in the storage 77. Alternatively, the receive-side controller 73 can obtain the information from the emit-side controller 61 via the receive-side communicator 80 and emit-side communicator 68. The receive-side controller 73 converts the rotational position of the laser beam L into a rotational angle (horizontal angle in FIG. 12A) relative to the position of the column 26, and places a point represented by the horizontal angle and the angle of site θv on the graph of FIG. 12A to decide whether or not this point is in the light shielding area As. Thus, the rotational position and the angle of site θv obtained in step S2 are applied to the graph FIG. 12A to thereby determine whether or not the laser beam L having reached the light receiver 71 is in the light shielding area As. When the laser beam is in the light shielding area As, the flow proceeds to step S4 for non-normal operation while it proceeds to step S5 for normal operation when it is not in the area As.

Since the laser beam L is determined to be in the light shielding area As, accurate surveying is not feasible using the laser beam L blocked by the column 26. Therefore, in step S4 surveying is normally performed with the laser beam L, however, resultant data is attached with information indicating that the laser beam L is in the light shielding area As, and stored. Further, to notify an operator, a message that accurate surveying is not possible is displayed on the display 74, the warning element 75 issues buzzing sound as warning or the message and warning sound are issued concurrently, for example. Alternatively, it can be configured that surveying is not performed with or without the issuance of the message and warning sound, and the notification that the laser beam L is in the light receiving area As can be displayed on the display 74.

In step S5 since it is determined that the laser beam L has not been blocked by the column 26 in step S3, normal surveying is performed with the laser beam L and resultant data is stored. Thus, the operation is completed.

For surveying with the laser surveying system 10, the operator places the light receiving unit 12 on the rod 14 at a target position and allows it to receive the laser beam L from the rotational light emitting unit 11 on the tripod 13 placed at the known point X, as shown in FIG. 1. The receive-side controller 73 of the light receiving unit 12 calculates the rotational angle of the laser beam L and the angle of site θv, proceeding to steps S1 to S2 in FIG. 13. When the laser beam L having reached the light receiver 71 is not in the light shielding area As, the light receiving unit 12 normally performs surveying using the received laser beam L, proceeding to steps S3 to S5. When the laser beam L is in the light shielding area As, the light receiving unit 12 performs surveying with the laser beam L and associates a surveying result with data indicating that the laser beam L is in the light shielding area As, proceeding to steps S3 to S4. Thus, at the time of receiving the laser beam L, the light receiving unit 12 can determine whether or not the laser beam L has been blocked by the columns 26, decide how to handle the light receiving signal of the laser beam L on the basis of a result of the determination and properly process surveying results. As a result, it is not necessary to determine how to process a surveying result after completing surveying.

Figure 12C:
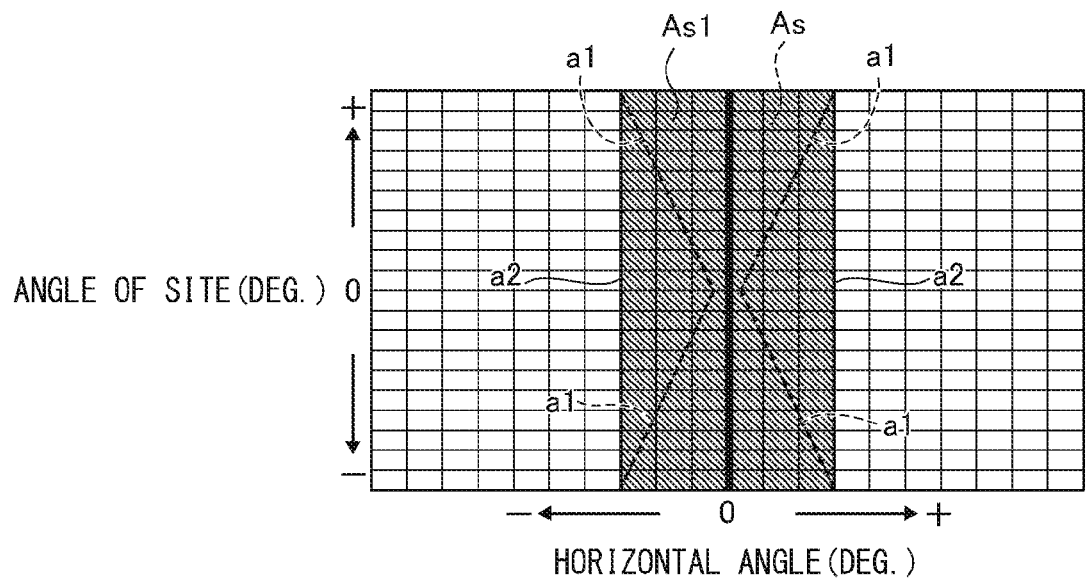
FIG. 12C is a graph of a light shielding area As1 only when the housing 32 is not tilted relative to the case 24.
Figure 12D:
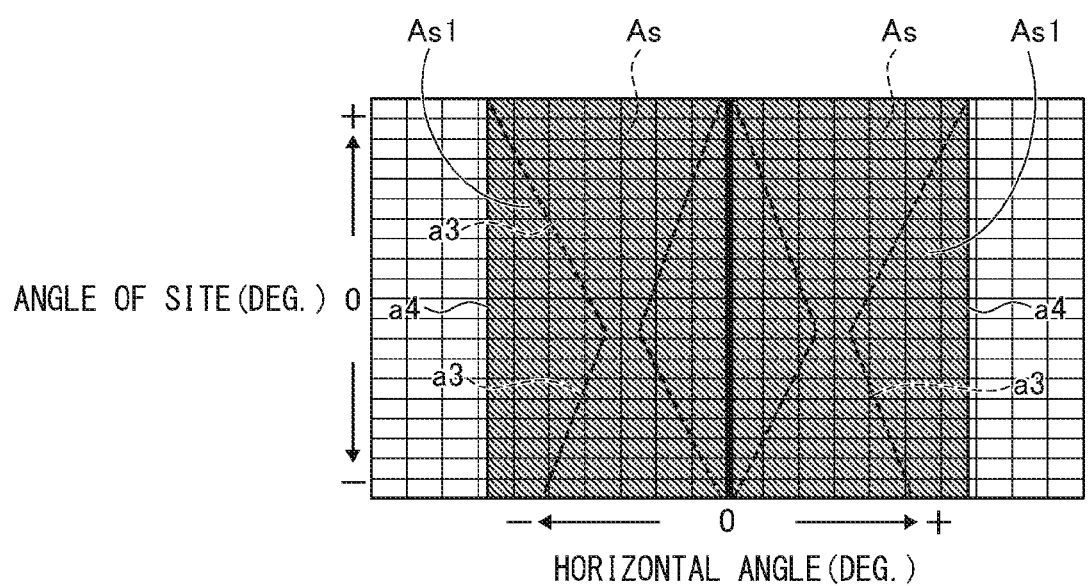
FIG. 12D is a graph of the same when all the situations in which the housing 32 is tilted relative to the case 24 is considered.
Figure 13:
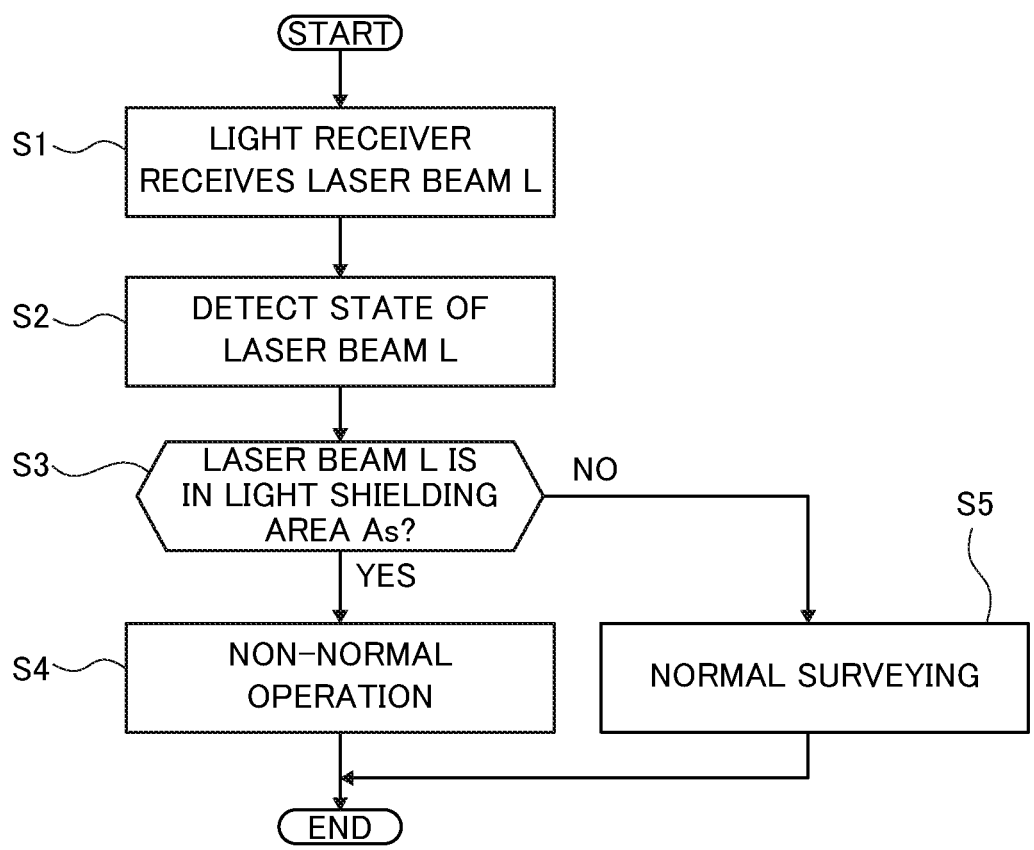
FIG. 13 is a flowchart of a determination process executed by a receive-side controller 73 according to one embodiment.

Next, problems in related art are described using a structure given the same reference codes as those of the laser surveying system 10 according to the present embodiment, referring to FIGS. 12C and 12D.

The rotational light emitting unit 11 cannot accurately emit the laser beam L when the laser beam L is partially blocked by any of the columns 26 in the housing and the light receiving unit 12 cannot secure the accuracy of surveying using the laser beam L, as described above.

In view of the above, the rotational light emitting unit 11 presets a certain light shielding area As1 in which the laser beam L is partially blocked by any of the columns 26, as shown in FIGS. 12C, 12D. It also superimposes a signal indicating that the laser beam L is or is not in the light shielding area As1 on the laser beam L. Thereby, the light receiving unit 12 can determine how to handle the laser beam L from the signal. When the laser beam L is in the light shielding area As1, surveying is not performed, while when the laser beam L is not therein, surveying is normally performed using the laser beam L.

However, in the above configuration the light shielding area As1 is defined only by the rotational position of the rotator 23 in the rotational light emitting unit 11 since the signal is superimposed on the laser beam L from the unit 11 and a change in the angle of site of the laser beam L relative to the reference plane Pb cannot be taken into account. Because of this, the light shielding area As1 has to include all the areas in which the laser beam L is partially blocked by the columns 26. Specifically, for example, if the housing 32 is not tilted to the case 24, the light shielding area As according to the present embodiment is as shown in FIG. 12A. Meanwhile, defined only by the rotational position, the light shielding area As1 needs to be set in the largest angle range of the light receiving area As as shown in FIG. 11C. Accordingly, the light shielding area As1 includes additional areas defined by side lines a1 and a2 in FIG. 12C which are not included in the light shielding area As. In the areas defined by the side lines a1 and a2, the laser beam L is not actually blocked by the columns 26 so that it can be properly emitted from the rotational light emitting unit 11. However, upon receiving the signal indicating that the laser beam L is included in the light shielding area As1, the light receiving unit 12 determines that accurate surveying is not feasible.

Especially, the light shielding area As is shifted in accordance with the amount and direction of the tilt of the housing 32 relative to the case 24 (FIGS. 12A, 12B), as described above. It is necessary to set the light shielding area As1 to include all the areas in which the laser beam L is blocked in accordance with all the tilt states of the housing 32. Specifically, FIG. 12B shows the light shielding area As when the housing 32 vertically stands in the tilted case 24 as shown in FIG. 11C. Further, if the housing 32 is tilted at the same angle in the opposite side horizontally from FIG. 11C, the light shielding area As will be the one in FIG. 12D (right side of the area As indicated by the two-dot chain lines) horizontally inversed from FIG. 12B. In FIGS. 11C and 12B the tilt of the housing 32 is assumed to be maximal. The light shielding area As1 defined only by the rotational position corresponds to the light shielding area As in the largest angle range, as shown in FIG. 12D. Further, the light shielding area As1 contains the areas defined by the outer side lines a3 of the light receiving area As at the largest tilt and the outer side lines a4 of the light receiving area As1 in FIG. 12D.

Thus, the related art laser surveying system as above determines that the laser beam L is in the light shielding area As1 even if the laser beam L is not blocked by the columns 26 actually. Accordingly, it erroneously determines that accurate surveying is not feasible and unnecessarily narrows a proper surveying area. For example, when the beam emitter 31 is tilted as shown in FIGS. 11A and 11B and the laser beam L is determined to be in the light shielding area As1 in FIG. 12D, the laser beam L is not actually blocked by the columns 26 in the light shielding area As1 excluding the light shielding area As in FIG. 12A. Likewise, when the beam emitter 31 is tilted as shown in FIG. 11C, the laser beam L is not actually blocked by the columns 26 in the light shielding area As1 excluding the light shielding area As in FIG. 12B.

Meanwhile, in the laser surveying system 10 according to the present embodiment the light shielding area As is defined by the rotational angle and the angle of site θv of the irradiation axis Ai. Because of this, the light shielding area As is properly set to match the area in which the laser beam L is blocked by the columns 26 and the laser surveying system can appropriately determine whether or not the laser beam L has been correctly emitted from the rotational light emitting unit 11. Accordingly, it can accurately determine whether or not surveying is properly feasible with the laser beam L.

Furthermore, in the laser surveying system 10 the receive-side controller 73 of the light receiving unit 12 determines how to handle the laser beam L using the light shielding area As. Therefore, the laser surveying system 10 can appropriately determine whether the laser beam L has been properly emitted when the light receiving unit 12 receives the laser beam L.

Further, in the laser surveying system 10 the receive-side controller 73 of the light receiving unit 12 can easily and surely acquire information on the rotational position of the irradiation axis Ai of the housing 32 since the position signal Sr is superimposed on the laser beam L emitted from the rotational light emitting unit 11. This eliminates the necessity for an additional communication means only to transfer the rotational position of the irradiation axis Ai. The light receiving unit 12 can securely receive the laser beam L.

To determine the state of the emitted laser beam L, it is necessary to correctly obtain the direction in which the laser beam L is emitted relative to each column 26. Also, it is needed to deal with the exit position of the beam emitter 31 and the position of the light receiver 71 of the light receiving unit 12 on the same coordinates and precisely measure the positions and acquire the relation between their coordinates. However, according to the present embodiment it is unneeded to measure and calculate these positions and relation between their coordinates owing to the laser beam L on which the position signal Sr is superimposed. Since the position signal Sr indicates the rotational angle between the irradiation axis Ai and the reference position, that is, the direction of the emitted laser beam L, the light shielding area As can be set on the basis of the rotational position of each column 26 relative to the reference position of the rotational light emitting unit 11. Further, owing to the laser beam L with the position signal Sr superimposed, the light receiving unit 12 has only to receive the laser beam L as in the normal surveying. Thus, the laser surveying system 10 can easily and properly determine whether or not the laser beam L has been properly emitted.

Further, the position signal Sr is a signal with a frequency continuously fluctuating from 0 degree or more to less than 360 degrees relative to the reference position and the frequencies correspond to the angles on one-to-one basis. Because of this, the light receiving unit 12 can acquire a precise rotational position of the rotator 23 when emitting the laser beam L. Accordingly, the laser surveying system 10 can more precisely set the light shielding area As and more correctly determine whether or not the laser beam L has been properly emitted.

In the laser surveying system 10 only by receiving the laser beam L as in the normal surveying, the light receiving unit 12 can obtain the rotational angle of the irradiation axis Ai of the beam emitter 31 and the angle of site θ relative to the reference plane Pb from the laser beam L, to determine whether or not the laser beam L has been emitted properly.

According to the laser surveying system 10, the light receiving unit 12 in a simple structure can surely obtain the rotational position of the rotator 23 in the rotational light emitting unit 11 from the positional signal Sr superimposed on the laser beam L. For surveying with the rotational light emitting unit 11 and the light receiving unit 12, it is indispensable for the light receiving unit 12 to receive the laser beam L.

Further, in the laser surveying system 10 the laser beam L of the rotational light emitting unit 11 comprises the three beams S1 to S3. Thereby, the light receiving unit 12 in a simple structure can obtain the angle of site θv between the exit of the beam emitter 31 and the reference plane Pb from the three beams S1 to S3. It can thus obtain the rotational angle of the irradiation axis Ai and the angle of site θ relative to the reference plane Pb accurately.

Furthermore, the three beams S1 to S3 are fan beams. Thereby, the light receiving unit 12 in a simple structure can obtain the angle of site θv between the exit of the beam emitter 31 and the reference plane Pb from the three beams S1 to S3 irrespective of the distance from the rotational light emitting unit 11. It can thus obtain the rotational angle of the irradiation axis Ai and the angle of site θ relative to the reference plane Pb easily and properly irrespective of the distance from the rotational light emitting unit 11.

In the laser surveying system 10 the light shielding areas As are set in accordance with the positions of the columns 26 relative to the exit of the beam emitter 31, that is, the pentaprism 54. The light receiving unit 12 determines whether or not the laser beam L received at the light receiver 71 is in the light shielding areas As to determine whether the laser beam L has been appropriately emitted. Accordingly, the laser surveying system 10 can easily and accurately decide the laser beam L as the one blocked by the columns 26.

According to the laser surveying system 10 the light shielding area As are changed in accordance with a change in the tilt of the housing 32 relative to the case 24. Therefore, it is possible to prevent the laser surveying system 10 from erroneously determining that the laser beam L has not been properly emitted due to the fact that the laser beam L is in the light shielding area As which does not correspond to an actual tilt state of the housing. Thus, the laser surveying system 10 does not unnecessarily narrow the surveying area and can accurately determine whether or not surveying is feasible.

According to the laser surveying system 10 the tilt driver 64 adjusts the tilt amount and direction of the housing 32 relative to the case 24 so that the level sensors 49 both detect desired values constantly, to tilt the beam emitter 31 at an arbitrary angle in an arbitrary direction. Thereby, the rotational light emitting unit 11 can rotate to project the laser beam L with the reference plane Pb tilted at an arbitrary angle in an arbitrary direction relative to the horizontal plane. Further, the light shielding areas As are changed in accordance with a change in the tilt of the housing 32 of the rotational light emitting unit 11 relative to the case 24. Accordingly, the laser surveying system 10 can properly determine whether the laser beam L is properly emitted in accordance with the state of the housing 32, even if the reference plane Pb of the laser beam is tilted relative to the horizontal plane.

Accordingly the laser surveying system 10 can prevent a surveying area from being unnecessarily narrowed while preventing a decrease in surveying quality.

The laser surveying system 10 should not be limited to the one described above as long as it comprises a rotational light emitting unit to rotationally emit a laser beam, comprising a case and a beam emitter supported on the case with an optical axis of the laser beam rotatable relative to the case; and a light receiving unit to receive the laser beam from the rotational light emitting unit and perform surveying of a light-receiving position, wherein the laser surveying system is configured to determine whether or not the laser beam received by the light receiving unit has been properly emitted from the rotational light emitting unit on the basis of a rotational position of the optical axis of the laser beam relative to the case and an angle of site of the laser beam relative to a reference plane including the optical axis.

Further, the determination on the emitted laser beam L can be arbitrarily configured as long as the light receiving unit can make the determination on the basis of the rotational position of the irradiation axis Ai and the angle of site θv.

Further, in replace of the receive-side controller 73 of the light receiving unit 12, another means such as the receive-side communicator 80 or input 76 can be configured to acquire either or both of the rotational position and the angle of site θv.

In place of the three beams S1 to S3 as the laser beam L, the rotational light emitting unit 11 can be configured to emit a single beam. In this case it is preferable that the light receiving unit 12 determines the angle of site θv relative to the reference plane Pb (irradiation axis Ai). For example, the light receiver thereof is formed in rectangular and includes two light-receiving areas divided by a line inclined to vertical and horizontal directions. Thereby, it can determine the angle of site θv in the same manner as in the above embodiment.

The above embodiment has described an example where the laser beam L from the beam generator 51 is converted to the three beams S1 to S3 by the diffraction grating 53. Alternatively, the beams S1 to S3 can be emitted from different light sources. In this case the position signal Sr can be superimposed on at least one of the beams S1 to S3.

Further, the above embodiment has described an example where the four columns 26 are provided in the case 24 of the rotational light emitting unit 11. Alternatively, the number and shape of the columns 26 can be arbitrarily decided.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A laser surveying system comprising:
    a rotational light emitting unit to rotationally emit a laser beam, comprising a case and a beam emitter supported on the case with an optical axis of the laser beam rotatable relative to the case, and an emit-side controller to acquire a rotational position of the optical axis of the laser beam relative to the case; and
    a light receiving unit to receive the laser beam from the rotational light emitting unit and perform surveying of a light-receiving position,
    the light receiving unit comprising a receive-side controller to:
        acquire an angle of site of the laser beam relative to a reference plane including the optical axis of the laser beam,
        acquire a light shielding area in which the laser beam is blocked, wherein the light shielding area is defined by the rotational position and the angle of site, and
        determine whether or not the laser beam received by the light receiving unit has been properly emitted from the rotational light emitting unit on the basis of the rotational position, the angle of site, and the light shielding area.

2. The laser surveying system according to claim 1, wherein:
    the emit-side controller is configured to superimpose a position signal indicating the rotational position on the laser beam emitted from the rotational light emitting unit; and
    the receive-side controller is configured to acquire the rotational position from the position signal of the laser beam received by the light receiving unit.

3. The laser surveying system according to claim 2, wherein:
    the laser beam emitted from the rotational light emitting unit comprises two beams parallel to each other with an interval on a plane orthogonal to the optical axis and a beam tilted relative to the two beams between the two beams; and
    the receive-side controller is configured to acquire the angle of site on the basis of a time interval between the three laser beams received by the light receiving unit.

4. The laser surveying system according to claim 3, wherein:
    the three beams are fan beams expanding as moving away from an exit position.

5. The laser surveying system according to claim 1, wherein:
    the case includes a column over which the optical axis crosses when rotated by the beam emitter;
    the light shielding area is set according to a positional relationship between the column and the beam emitter; and
    the receive-side controller is configured to determine whether or not the laser beam received by the light receiving unit is in the light shielding area, to thereby determine whether or not the laser beam received by the light receiving unit has been properly emitted from the rotational light emitting unit.

6. The laser surveying system according to claim 5, wherein:
    the case is configured to tiltably support the beam emitter;
    the rotational light emitting unit comprises a tilt detector to detect a state of tilt of the beam emitter relative to the case;
    the receive-side controller is configured to acquire the state of tilt detected by the tilt detector via the emit-side controller and change the light shielding area in accordance with a change in the state of tilt.

7. The laser surveying system according to claim 6, wherein the rotational light emitting unit further comprises
    a verticality detector to a tilt of the beam emitter relative to a vertical direction, and
    a tilt mechanism to adjust a direction and amount of the beam emitter relative to the case.

8. A laser surveying system comprising:
    a rotational light emitting unit to rotationally emit a laser beam; and
    a light receiving unit to receive the laser beam from the rotational light emitting unit and perform surveying of a light-receiving position, wherein
    the rotational light emitting unit comprises an emit-side controller to acquire a rotational angle of a light-receiving position of the light receiving unit in a rotational direction of the rotational light emitting unit; and
    the light receiving controller a receive-side controller to:
        acquire an angle of site of the laser beam relative to a reference plane including the optical axis of the laser beam, acquire a light shielding area in which the laser beam is blocked, wherein the light shielding area is defined by the rotational position and the angle of site, and determine whether or not the laser beam received by the light receiving unit has been properly emitted from the rotational light emitting unit on the basis of the rotational position, the angle of site, and the light shielding area.

\* \* \* \* \*

UNITED STATES PATENT AND TRADEMARK OFFICE
CERTIFICATE OF CORRECTION

| | | |
|---|---|---|
| PATENT NO. | : 9,273,960 B2 | Page 1 of 1 |
| APPLICATION NO. | : 14/502712 | |
| DATED | : March 1, 2016 | |
| INVENTOR(S) | : Kaoru Kumagai et al. | |

It is certified that error appears in the above-identified patent and that said Letters Patent is hereby corrected as shown below:

In the Claims:

At column 20, claim number 8, line number 64, the phrase "the light receiving controller a receive side controller to:" should read --the light receiving unit comprises a receive side controller to:--.

Signed and Sealed this
Nineteenth Day of July, 2016

Michelle K. Lee
*Director of the United States Patent and Trademark Office*